United States Patent
Royak et al.

(10) Patent No.: US 7,609,014 B2
(45) Date of Patent: Oct. 27, 2009

(54) SYSTEM AND METHOD FOR UNIVERSAL ADAPTIVE TORQUE CONTROL OF PERMANENT MAGNET MOTORS

(75) Inventors: Semyon Royak, Beachwood, OH (US); Jingbo Liu, Milwaukee, WI (US); Peter B. Schmidt, Franklin, WI (US); Thomas A. Nondahl, Wauwatosa, WI (US); Mark Melvin Harbaugh, Richfield, OH (US); Robert John Breitzman, South Russel, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 357 days.

(21) Appl. No.: 11/550,944

(22) Filed: Oct. 19, 2006

(65) Prior Publication Data
US 2008/0094015 A1   Apr. 24, 2008

(51) Int. Cl.
*H02P 6/16*     (2006.01)

(52) U.S. Cl. ............... 318/400.12; 318/432; 318/434

(58) Field of Classification Search ............ 318/432, 318/434, 569, 600, 400.12
See application file for complete search history.

(56) References Cited

U.S. PATENT DOCUMENTS

| | | | | |
|---|---|---|---|---|
| 5,962,999 | A * | 10/1999 | Nakamura et al. | 318/432 |
| 6,583,593 | B2 * | 6/2003 | Iijima et al. | 318/400.32 |
| 2002/0125064 | A1 * | 9/2002 | Mori et al. | 180/444 |

* cited by examiner

*Primary Examiner*—Rina I Duda
(74) *Attorney, Agent, or Firm*—Quarles & Brady LLP; Alexander R. Kuszewski

(57) ABSTRACT

A system and method for controlling any of a variety of permanent magnet motors includes normalizing motor parameters with respect to demagnetization current of a motor and developing a torque-per-current relationship using the normalized motor parameters at approximately maximum torque. Using the developed torque-per-current relationship, it is possible to control any of a variety of permanent magnet motors without the need for extensive configuration of a motor control unit for a specific motor.

18 Claims, 11 Drawing Sheets

SYSTEM AND METHOD FOR UNIVERSAL ADAPTIVE TORQUE CONTROL OF PERMANENT MAGNET MOTORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to motor drives units and, more particularly, to a motor control unit configured to control operation of any of a variety of permanent magnet motors using a torque-per-current relationship developed using motor parameters normalized with respect to demagnetization current of a motor at approximately maximum torque. Accordingly, it is not necessary to optimize each motor drive unit for the particular motor associated therewith.

There are a variety of applications that require a motor to deliver constant power or torque over a wide operational range. Permanent magnet (PM) synchronous motors have often been utilized in such applications because, by properly adjusting the combination of magnetic saliency and permanent magnet flux in the PM motor design, the motor can achieve very high sustainable constant torque outputs.

However, in order to maximize or optimize output of the PM motor, for example, under torque control, knowledge of the motor must be assembled and then used to configure the motor control unit coupled with the particular PM motor. Such configuration and design can be rather costly, particularly, when compounded over many PM motors, for example, both internal PM motors and surface PM motors, and a variety of motor control units.

Therefore, it would be desirable to have a system and method to allow a given motor control unit to improve control of a PM motor without significant, motor-specific configuration and optimization. In particular, it would be advantageous to have a system and method for universal adaptive torque control that is compatible with both internal and surface mount permanent magnet motors.

BRIEF SUMMARY OF THE INVENTION

The present invention overcomes the aforementioned drawbacks by providing a system and method for controlling any of a variety of motors using a single motor control unit having stored therein a torque-current relationship at approximately maximum torque per amp derived based on motor parameters normalized with respect to demagnetization current of a motor. That is, the present invention facilitates improved control of both internal and surface PM motors by normalizing motor parameters with respect to the current required to demagnetize the motor magnet and constructing universal lookup tables. Using the torque-current relationship stored in the tables, the motor control unit can control any of a variety of motors.

In accordance with one aspect of the present invention, a motor control system is disclosed that includes a motor drive unit coupled to a motor and a controller configured to control the motor drive unit to drive the motor. The system also includes a memory unit accessible by the controller that has stored therein at least one table relating motor torque and motor current. Accordingly, the controller is configured to access the at least one memory unit and control the motor drive unit to torque control the motor based on the at least one table.

In accordance with another aspect of the present invention, a motor control system configured to control a variety of permanent magnet motors is disclosed. The motor control system includes a memory unit having stored therein a torque-current relationship at approximately maximum torque per amp derived based on motor parameters normalized with respect to demagnetization current of a motor. A processor is included that is configured to access the memory unit and control any of a variety of permanent magnet motors using the torque-current relationship stored therein.

In accordance with yet another aspect of the invention, a method for controlling a permanent magnet motor system is disclosed. The method includes normalizing motor parameters with respect to demagnetization current of a motor and developing a torque-current relationship using the normalized motor parameters at approximately maximum torque per amp. As such, it is possible to control any of a variety of permanent magnet motors using the developed torque-current relationship to reduce operational losses.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
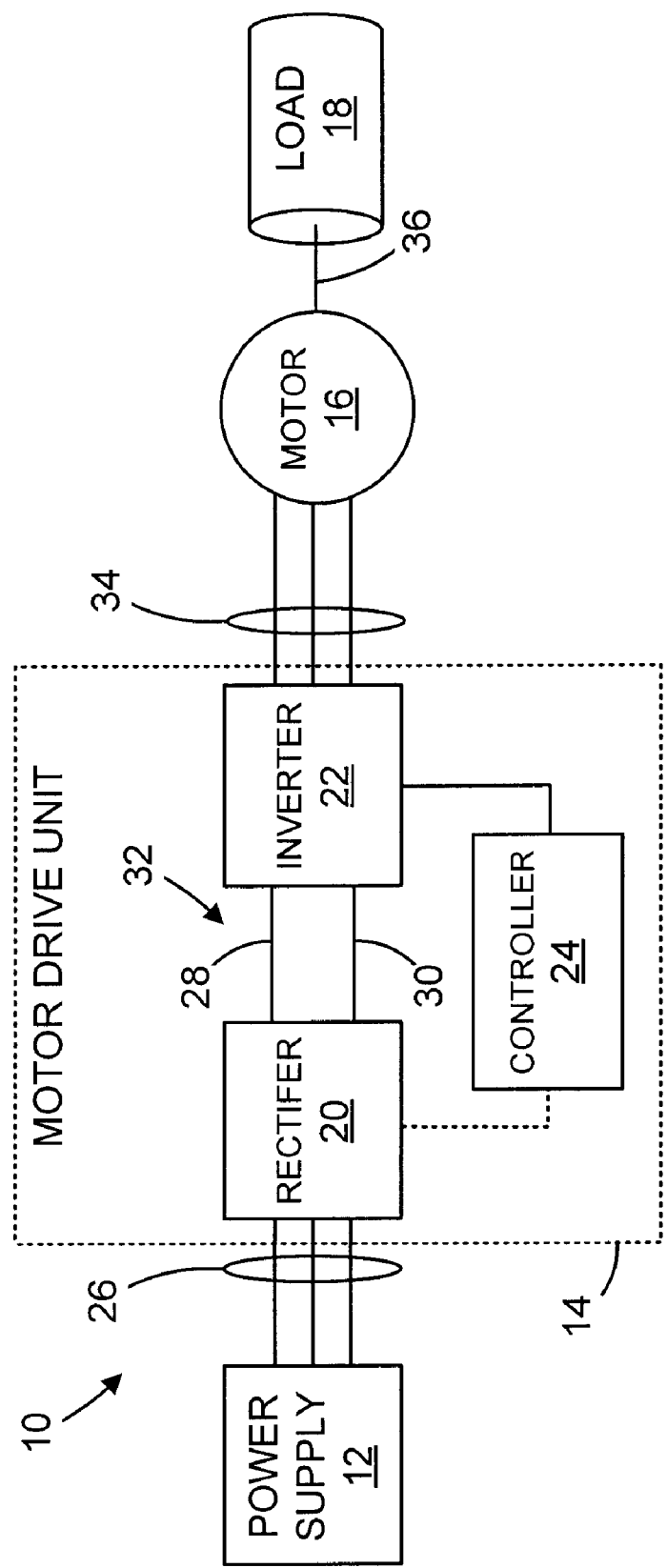
FIG. 1 is a schematic diagram of a motor system in accordance with the present invention.

Referring to FIG. 1, the present invention will be described with respect to a motor system 10. The motor system 10 generally includes a power supply 12, a motor drive unit 14, and a permanent magnet (PM) motor 16, which may be an internal or surface PM motor. The power supply 12 provides power to the motor drive unit 14 that, in turn, converts the power to a more usable form for the permanent magnet motor 16 that drives an associated load 18.

The motor drive unit 14 includes a variety of components, such as a rectifier 20, an inverter 22, and a controller 24. During operation, the power supply 12 provides three-phase AC power, for example, as received from a utility grid over transmission power lines 26. However, it is also contemplated that the power supply 12 may deliver single-phase power. The rectifier 20 is designed to receive the AC power from the power supply 12 and convert the AC power to DC power that is delivered to positive and negative DC buses 28, 30 of a DC link 32. It is also contemplated that the power supply may deliver DC power. In that case, the rectifier 20 would not be used, and the power supply 12 would connect directly to the DC link 32. The inverter 22, in turn, is positioned between the positive and negative DC buses 28, 30 to receive the DC power delivered by the rectifier 20. The inverter 22 includes a plurality of switching devices (e.g., IGBTs or other semiconductor switches) that are positioned between the positive and negative buses 28, 30 and controlled by the controller 24 to open and close specific combinations of the switches to sequentially generate pulses on each of the supply lines 34 to drive the motor 16 and, in turn, the load 18 through a drive shaft 36.

The potential for negative performance consequences caused by variations between individual motors 16 are typically accounted for by optimizing the configuration of the particular motor drive unit 14 and, in particular, the controller 24 associated with the individual motor 16. To facilitate control of any of a variety of PM motors without the undue burden of individually optimizing each motor drive unit 14 for a particular PM motor 16, the parameters of a variety of motors can be normalized about a particular operational area. In this regard, the motor drive unit 14 and, in particular, the controller 24 can be generally configured to be capable of controlling any of a variety of motors based on normalized parameters. As will be described, by selecting a substantially uniform operational area around which to normalize, the potential negative consequences arising from variations between motors is substantially reduced and control is substantially improved. In particular, as will be described, the motor drive unit 14 can control any of a variety of motors in a substantially optimal manner without the need for reconfiguration specific to the particular motor with which the motor drive unit is coupled. Rather, as will be described, knowledge of only the values of magnetic flux $\Psi_{m0}$, direct inductance $L_d$, and the quadrature inductance $L_q$ of the motor is necessary to initialize the motor drive unit 14 and, in particular, the controller 24 to control a given motor.

A. Theory.

Figure 2:
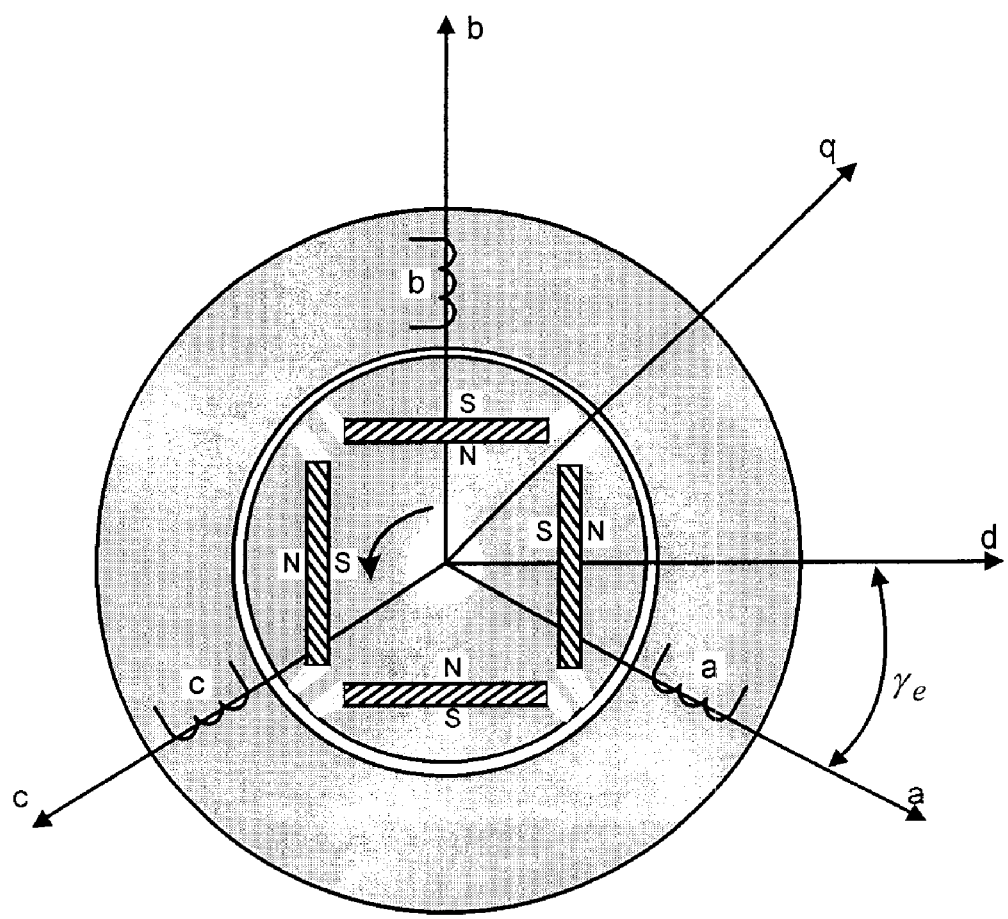
FIG. 2 is a simplified schematic diagram of an interior permanent magnet synchronous motor (IPMSM)

Referring now to FIG. 2, surface permanent magnet synchronous motors (SPMSM) and interior permanent magnet synchronous motors (IPMSM) modeled in the (d, q) frame coordinate system can be represented in the following well-known form:

$$V_d = R \cdot I_d + L_d \cdot \frac{dI_d}{dt} - L_q \cdot I_q \cdot \frac{d\gamma_e}{dt};$$ Eqn. 1

$$V_q = R \cdot I_q + L_q \cdot \frac{dI_q}{dt} + (L_d \cdot I_d + \psi_{m0}) \cdot \frac{d\gamma_e}{dt};$$ Eqn. 2

-continued $$J \cdot \frac{d^2 \gamma_e}{dt^2} = \frac{3}{2} \cdot p_n \cdot [\Psi_{m0} \cdot I_q + (L_d - L_q) \cdot I_d \cdot I_q] - T_{load};$$ Eqn. 3 where $\gamma_e$ is a electrical angle between axis of phase "a" and direct axis of a motor (see FIG. 3) and $L_q$ and $L_d$ are the self-inductance of the quadrature and direct axes, respectively. It is noted that for a non saliency motor (some SPMSM motors), $L_q$ is equal to $L_d$.

Equation 3 indicates that the torque for those motors that have a magnetic saliency ($L_q \approx L_d$) consist of two components: magnetic torque and reluctance torque. Changing $I_d$ and $I_q$ current components and keeping stator current $I_{st}$ constant, the maximum torque-per-amp case can be identified.

To find an optimum ratio between $I_d$ and $I_q$, first, equations 1 and 2 are rewritten for steady-state conditions as follows:

$$V_d = R \cdot I_d - L_q \cdot I_q \cdot \omega_e$$ Eqn. 4;

$$V_q = R \cdot I_q + \omega_e \cdot L_d \cdot I_d + \omega_e \cdot \Psi_{m0}$$ Eqn. 5;

or, $$V_d = R \cdot I_d - E_d$$ Eqn. 6;

$$V_q = R \cdot I_q + E_q$$ Eqn. 7;

where $$E_d = -L_q \cdot I_q \cdot \omega_e$$ Eqn. 8;

$$E_q = L_d \cdot I_d \cdot \omega_e + \Psi_{m0} \cdot \omega_e = L_d \cdot I_d \cdot \omega_e + E_0$$ Eqn. 9;

and $$E_\Sigma = \sqrt{E_d^2 + E_q^2} = \omega_e \cdot \sqrt{(L_q \cdot I_q)^2 + (L_d \cdot I_d + \Psi_{m0})^2}$$ Eqn. 10.

Figure 3:
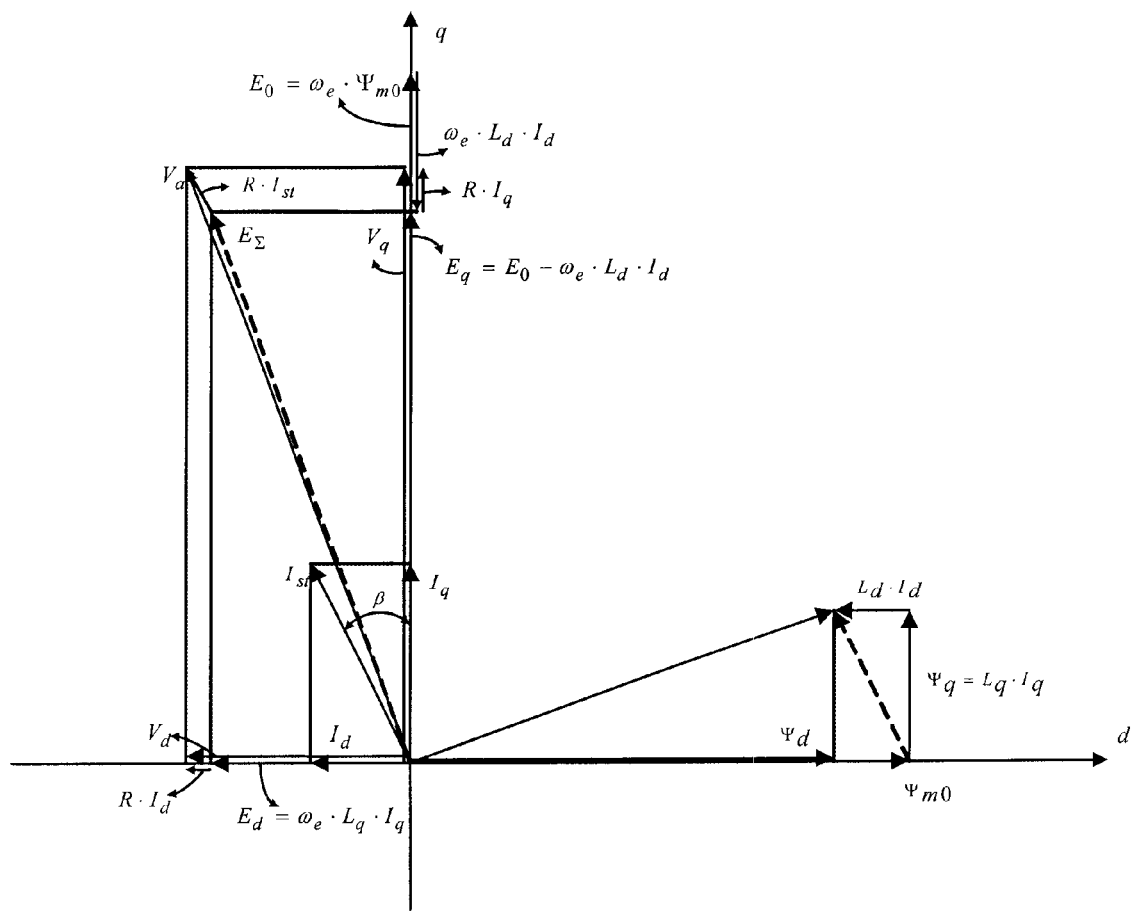
FIG. 3 is a phasor diagram of an IPMSM.

Equations 4-10 yield the phasor diagram illustrated in FIG. 3 of an IPMSM. The torque equation for the motor can be written using the well-known relationship:

$$T_{mot} = \frac{3}{2} \cdot p_n \cdot I_q \cdot [\Psi_{m0} - (L_q - L_d) \cdot I_d].$$ Eqn. 11

Using the phasor diagram illustrated in FIG. 3, it can be seen that the "q" and "d" current components have the following relationships:

$$I_d = -I_{st} \cdot \sin \beta$$ Eqn. 12;

$$I_q = I_{st} \cdot \cos \beta$$ Eqn. 13;

and $$I_{st}^2 = I_d^2 + I_q^2$$ Eqn. 14.

By examining the demagnetization of the permanent magnet due to the d-axis armature reaction, the d-current ($I_d$) that fully demagnetizes the magnets is represented by:

$$I_{df} = -\frac{\Psi_{m0}}{L_d}.$$ Eqn. 15

These equations can be rewritten in per-unit form, such that the normalized torque is defined as the following ratio:

$$\hat{T} = \frac{T_{mot}}{T_{base}} = \frac{T_{mot}}{\frac{3}{2} \cdot p_n \cdot \Psi_{m0} \cdot I_{df}}; \quad \text{Eqn. 16}$$

where $$T_{base} = \frac{3}{2} \cdot p_n \cdot \Psi_{m0} \cdot I_{df}. \quad \text{Eqn. 17}$$

By substituting Equation 11 into Equation 16, the following equation is yielded:

$$\hat{T} = \frac{I_q}{I_{df}} \cdot \left[1 - \frac{L_d \cdot \left(\frac{L_q}{L_d} - 1\right) \cdot I_d}{\Psi_{m0}}\right] \quad \text{Eqn. 18}$$

$$= \frac{I_q}{I_{df}} \cdot \left[1 - \frac{\left(\frac{L_q}{L_d} - 1\right) \cdot I_d}{\frac{\Psi_{m0}}{L_d}}\right]$$

$$= \frac{I_q}{I_{df}} \cdot \left[1 - \left(\frac{L_q}{L_d} - 1\right) \cdot \frac{I_d}{I_{df}}\right];$$

which can be readily simplified to the following per-unit torque equation:

$$\hat{T} = \hat{I}_q \cdot (1 - K \cdot \hat{I}_d) \quad \text{Eqn. 19;}$$

and per-unit current equations:

$$\hat{I}_d = -\hat{I}_{st} \cdot \sin\beta; \quad \text{Eqn. 20}$$

$$\hat{I}_q = \hat{I}_{st} \cdot \cos\beta; \quad \text{Eqn. 21}$$

$$\hat{I}_{st}^2 = \hat{I}_d^2 + \hat{I}_q^2; \quad \text{Eqn. 22}$$

where, $$\hat{I}_q = \frac{I_q}{I_{df}}; \quad \text{Eqn. 23}$$

$$\hat{I}_{st} = \frac{I_{st}}{I_{df}}; \quad \text{Eqn. 24}$$

and $$K = \left(\frac{L_q}{L_d} - 1\right); \quad \text{Eqn. 25}$$

Hence, using Equations 19-25, the maximum-torque-per-current relationship of the motor can be derived. By substituting Equations 20-22 into Equation 19, the following relationship between torque and current is yielded:

$$\hat{T} = \hat{I}_{st} \cdot \cos\beta \cdot (1 + K \cdot \hat{I}_{st} \cdot \sin\beta) = \hat{I}_{st} \cdot \cos\beta + K \cdot \hat{I}_{st}^2 \cdot \cos\beta \cdot \sin\beta \quad \text{Eqn. 26;}$$

To find the maximum torque value, the derivative of torque with respect to "β" is taken and equated to zero:

$$\frac{d\hat{T}}{d\beta} = -\hat{I}_{st} \cdot \sin\beta - K \cdot \hat{I}_{st}^2 \cdot \sin^2\beta + K \cdot \hat{I}_{st}^2 \cdot \cos^2\beta \quad \text{Eqn. 27}$$

$$= -\hat{I}_{st} \cdot \sin\beta - K \cdot \hat{I}_{st}^2 \cdot \sin^2\beta + K \cdot \hat{I}_{st}^2 - K \cdot \hat{I}_{st}^2 \cdot \sin^2\beta$$

$$= 0;$$

or $$-2 \cdot K \cdot \hat{I}_{st}^2 \cdot \sin^2\beta - \hat{I}_{st} \cdot \sin\beta + K \cdot \hat{I}_{st}^2 = 0; \quad \text{Eqn. 28}$$

and $$\sin^2\beta + \frac{1}{2 \cdot K \cdot \hat{I}_{st}} \cdot \sin\beta - \frac{1}{2} = 0; \quad \text{Eqn. 29}$$

By simplifying the following equations are yielded:

$$\sin\beta = \frac{1}{4 \cdot K \cdot \hat{I}_{st}} \cdot \left[\sqrt{1 + 8 \cdot K^2 \cdot \hat{I}_{st}^2} - 1\right]; \quad \text{Eqn. 30}$$

$$\hat{I}_d = -\hat{I}_{st} \cdot \sin\beta = -\frac{1}{4 \cdot K} \cdot \left[\sqrt{1 + 8 \cdot K^2 \cdot \hat{I}_{st}^2} - 1\right]; \quad \text{Eqn. 31}$$

and $$\hat{I}_q = \sqrt{\hat{I}_{st}^2 - \hat{I}_d^2} \quad \text{Eqn. 32}$$

$$= \sqrt{\hat{I}_{st}^2 - \frac{1}{16 \cdot K^2} \cdot \left[\sqrt{1 + 8 \cdot K^2 \cdot \hat{I}_{st}^2} - 1\right]^2}.$$

By substituting Equations 31 and 32 into Equation 19, the per-unit maximum-torque-per-current relationship for a given motor is represented by:

$$\hat{T} = \frac{T_{mot}}{\frac{3}{2} \cdot p_n \cdot \Psi_{m0} \cdot I_{df}} \quad \text{Eqn. 33}$$

$$= \left[1 + \frac{1}{4} \cdot \left[\sqrt{1 + 8 \cdot K^2 \cdot \hat{I}_{st}^2} - 1\right]\right] \cdot$$

$$\sqrt{\hat{I}_{st}^2 - \frac{1}{16 \cdot K^2} \cdot \left[\sqrt{1 + 8 \cdot K^2 \cdot \hat{I}_{st}^2} - 1\right]^2};$$

Using Equations 31-33, the following three universal, 2-dimensional, per-unit look-up tables for substantially optimum torque control can be generated. Tables I-III demonstrate one example for these optimum tables.

TABLE I

Torque-Current ($I_{st}$) 2-D Look-up-Table

| | | K = ($L_q/L_d$ − 1) | | | | | | | | | | |
|---|---|---|---|---|---|---|---|---|---|---|---|---|
| | | 0.00 | 0.25 | 0.50 | 0.75 | 1.00 | 1.25 | 1.50 | 1.75 | 2.00 | 2.25 | 2.50 |
| Torque per unit | 0.00 | 0.00000 | 0.00000 | 0.00000 | 0.00000 | 0.00000 | 0.00000 | 0.00000 | 0.00000 | 0.00000 | 0.00000 | 0.00000 |
| | 0.05 | 0.05000 | 0.05000 | 0.04998 | 0.04996 | 0.04994 | 0.04990 | 0.04986 | 0.04981 | 0.04976 | 0.04969 | 0.04963 |
| | 0.10 | 0.10000 | 0.09997 | 0.09988 | 0.09972 | 0.09951 | 0.09925 | 0.09894 | 0.09858 | 0.09819 | 0.09776 | 0.09730 |
| | 0.15 | 0.15000 | 0.14989 | 0.14958 | 0.14908 | 0.14841 | 0.14759 | 0.14664 | 0.14560 | 0.14448 | 0.14331 | 0.14210 |

TABLE I-continued

Torque-Current ($I_{st}$) 2-D Look-up-Table

| | | | | | | | | | | | |
|---|---|---|---|---|---|---|---|---|---|---|---|
| 0.20 | 0.20000 | 0.19975 | 0.19903 | 0.19788 | 0.19638 | 0.19461 | 0.19264 | 0.19054 | 0.18836 | 0.18614 | 0.18391 |
| 0.25 | 0.25000 | 0.24952 | 0.24813 | 0.24598 | 0.24326 | 0.24016 | 0.23683 | 0.23337 | 0.22989 | 0.22642 | 0.22301 |
| 0.30 | 0.30000 | 0.29917 | 0.29682 | 0.29328 | 0.28896 | 0.28419 | 0.27921 | 0.27419 | 0.26924 | 0.26441 | 0.25974 |
| 0.35 | 0.35000 | 0.34869 | 0.34504 | 0.33973 | 0.33345 | 0.32672 | 0.31989 | 0.31316 | 0.30664 | 0.30038 | 0.29441 |
| 0.40 | 0.40000 | 0.39805 | 0.39276 | 0.38528 | 0.37673 | 0.36782 | 0.35898 | 0.35044 | 0.34229 | 0.33458 | 0.32729 |
| 0.45 | 0.45000 | 0.44725 | 0.43993 | 0.42992 | 0.41882 | 0.40756 | 0.39661 | 0.38620 | 0.37640 | 0.36721 | 0.35862 |
| 0.50 | 0.50000 | 0.49625 | 0.48652 | 0.47365 | 0.45977 | 0.44602 | 0.43289 | 0.42058 | 0.40912 | 0.39847 | 0.38859 |
| 0.55 | 0.55000 | 0.54505 | 0.53253 | 0.51648 | 0.49964 | 0.48330 | 0.46794 | 0.45371 | 0.44059 | 0.42850 | 0.41734 |
| 0.60 | 0.60000 | 0.59363 | 0.57793 | 0.55843 | 0.53848 | 0.51947 | 0.50186 | 0.48572 | 0.47094 | 0.45742 | 0.44500 |
| 0.65 | 0.65000 | 0.64198 | 0.62272 | 0.59952 | 0.57633 | 0.55462 | 0.53474 | 0.51668 | 0.50028 | 0.48534 | 0.47169 |
| 0.70 | 0.70000 | 0.69008 | 0.66690 | 0.63979 | 0.61327 | 0.58881 | 0.56667 | 0.54671 | 0.52869 | 0.51236 | 0.49751 |
| 0.75 | 0.75000 | 0.73793 | 0.71048 | 0.67926 | 0.64934 | 0.62211 | 0.59771 | 0.57586 | 0.55625 | 0.53856 | 0.52252 |
| 0.80 | 0.80000 | 0.78551 | 0.75345 | 0.71797 | 0.68458 | 0.65459 | 0.62792 | 0.60422 | 0.58304 | 0.56400 | 0.54679 |
| 0.85 | 0.85000 | 0.83282 | 0.79584 | 0.75594 | 0.71906 | 0.68628 | 0.65738 | 0.63183 | 0.60910 | 0.58875 | 0.57039 |
| 0.90 | 0.90000 | 0.87985 | 0.83764 | 0.79322 | 0.75279 | 0.71725 | 0.68613 | 0.65875 | 0.63450 | 0.61285 | 0.59338 |
| 0.95 | 0.95000 | 0.92659 | 0.87887 | 0.82982 | 0.78584 | 0.74753 | 0.71421 | 0.68504 | 0.65928 | 0.63636 | 0.61578 |
| 1.00 | 1.00000 | 0.97304 | 0.91955 | 0.86578 | 0.81823 | 0.77717 | 0.74167 | 0.71072 | 0.68349 | 0.65931 | 0.63765 |
| 1.05 | 1.05000 | 1.01920 | 0.95968 | 0.90113 | 0.85000 | 0.80621 | 0.76854 | 0.73584 | 0.70716 | 0.68174 | 0.65903 |
| 1.10 | 1.10000 | 1.06505 | 0.99928 | 0.93588 | 0.88118 | 0.83467 | 0.79487 | 0.76044 | 0.73032 | 0.70369 | 0.67993 |
| 1.15 | 1.15000 | 1.11060 | 1.03837 | 0.97008 | 0.91180 | 0.86259 | 0.82068 | 0.78454 | 0.75301 | 0.72518 | 0.70040 |
| 1.20 | 1.20000 | 1.15585 | 1.07695 | 1.00372 | 0.94189 | 0.89000 | 0.84600 | 0.80818 | 0.77525 | 0.74625 | 0.72045 |
| 1.25 | 1.25000 | 1.20080 | 1.11505 | 1.03686 | 0.97146 | 0.91692 | 0.87086 | 0.83137 | 0.79707 | 0.76691 | 0.74012 |
| 1.30 | 1.30000 | 1.24544 | 1.15267 | 1.06949 | 1.00056 | 0.94339 | 0.89527 | 0.85415 | 0.81849 | 0.78719 | 0.75942 |
| 1.35 | 1.35000 | 1.28977 | 1.18983 | 1.10164 | 1.02919 | 0.96941 | 0.91927 | 0.87652 | 0.83953 | 0.80710 | 0.77837 |
| 1.40 | 1.40000 | 1.33380 | 1.22654 | 1.13333 | 1.05738 | 0.99501 | 0.94287 | 0.89852 | 0.86021 | 0.82668 | 0.79700 |
| 1.45 | 1.45000 | 1.37753 | 1.26282 | 1.16459 | 1.08514 | 1.02021 | 0.96610 | 0.92016 | 0.88055 | 0.84592 | 0.81531 |
| 1.50 | 1.50000 | 1.42095 | 1.29867 | 1.19541 | 1.11250 | 1.04503 | 0.98896 | 0.94146 | 0.90057 | 0.86486 | 0.83333 |
| 1.55 | 1.55000 | 1.46408 | 1.33412 | 1.22583 | 1.13947 | 1.06948 | 1.01148 | 0.96244 | 0.92027 | 0.88350 | 0.85106 |
| 1.60 | 1.60000 | 1.50690 | 1.36917 | 1.25585 | 1.16607 | 1.09358 | 1.03366 | 0.98310 | 0.93968 | 0.90186 | 0.86852 |
| 1.65 | 1.65000 | 1.54943 | 1.40383 | 1.28549 | 1.19231 | 1.11735 | 1.05553 | 1.00346 | 0.95880 | 0.91994 | 0.88572 |
| 1.70 | 1.70000 | 1.59167 | 1.43811 | 1.31476 | 1.21820 | 1.14079 | 1.07710 | 1.02353 | 0.97766 | 0.93777 | 0.90267 |
| 1.75 | 1.75000 | 1.63362 | 1.47203 | 1.34368 | 1.24376 | 1.16392 | 1.09837 | 1.04333 | 0.99625 | 0.95535 | 0.91939 |
| 1.80 | 1.80000 | 1.67528 | 1.50559 | 1.37225 | 1.26900 | 1.18675 | 1.11937 | 1.06287 | 1.01459 | 0.97270 | 0.93587 |
| 1.85 | 1.85000 | 1.71665 | 1.53880 | 1.40049 | 1.29393 | 1.20930 | 1.14010 | 1.08215 | 1.03269 | 0.98981 | 0.95214 |
| 1.90 | 1.90000 | 1.75777 | 1.57168 | 1.42841 | 1.31856 | 1.23156 | 1.16056 | 1.10119 | 1.05056 | 1.00670 | 0.96820 |
| 1.95 | 1.95000 | 1.79855 | 1.60423 | 1.45602 | 1.34291 | 1.25356 | 1.18078 | 1.11999 | 1.06821 | 1.02338 | 0.98406 |
| 2.00 | 2.00000 | 1.83909 | 1.63646 | 1.48333 | 1.36698 | 1.27531 | 1.20075 | 1.13857 | 1.08564 | 1.03986 | 0.99972 |

| | | $K = (L_q/L_d - 1)$ | | | | | | | | | |
|---|---|---|---|---|---|---|---|---|---|---|---|
| | | 2.75 | 3.00 | 3.25 | 3.50 | 3.75 | 4.00 | 4.25 | 4.50 | 4.75 | 5.00 |
| Torque per unit | 0.00 | 0.00000 | 0.00000 | 0.00000 | 0.00000 | 0.00000 | 0.00000 | 0.00000 | 0.00000 | 0.00000 | 0.00000 |
| | 0.05 | 0.04955 | 0.04947 | 0.04938 | 0.04929 | 0.04920 | 0.04909 | 0.04899 | 0.04888 | 0.04877 | 0.04865 |
| | 0.10 | 0.09682 | 0.09632 | 0.09580 | 0.09527 | 0.09473 | 0.09418 | 0.09363 | 0.09307 | 0.09251 | 0.09196 |
| | 0.15 | 0.14086 | 0.13961 | 0.13835 | 0.13710 | 0.13585 | 0.13462 | 0.13340 | 0.13220 | 0.13103 | 0.12987 |
| | 0.20 | 0.18169 | 0.17949 | 0.17733 | 0.17522 | 0.17316 | 0.17115 | 0.16919 | 0.16729 | 0.16544 | 0.16365 |
| | 0.25 | 0.21968 | 0.21645 | 0.21332 | 0.21029 | 0.20737 | 0.20456 | 0.20185 | 0.19924 | 0.19672 | 0.19429 |
| | 0.30 | 0.25524 | 0.25093 | 0.24681 | 0.24286 | 0.23908 | 0.23547 | 0.23202 | 0.22871 | 0.22554 | 0.22250 |
| | 0.35 | 0.28873 | 0.28333 | 0.27822 | 0.27335 | 0.26874 | 0.26435 | 0.26017 | 0.25618 | 0.25238 | 0.24875 |
| | 0.40 | 0.32043 | 0.31396 | 0.30787 | 0.30211 | 0.29667 | 0.29152 | 0.28664 | 0.28200 | 0.27759 | 0.27340 |
| | 0.45 | 0.35059 | 0.34306 | 0.33601 | 0.32938 | 0.32314 | 0.31725 | 0.31169 | 0.30643 | 0.30143 | 0.29669 |
| | 0.50 | 0.37940 | 0.37084 | 0.36284 | 0.35536 | 0.34834 | 0.34175 | 0.33553 | 0.32966 | 0.32410 | 0.31883 |
| | 0.55 | 0.40701 | 0.39744 | 0.38853 | 0.38022 | 0.37245 | 0.36516 | 0.35831 | 0.35185 | 0.34574 | 0.33997 |
| | 0.60 | 0.43357 | 0.42300 | 0.41320 | 0.40409 | 0.39558 | 0.38763 | 0.38015 | 0.37313 | 0.36649 | 0.36023 |
| | 0.65 | 0.45917 | 0.44764 | 0.43697 | 0.42707 | 0.41786 | 0.40924 | 0.40117 | 0.39360 | 0.38645 | 0.37971 |
| | 0.70 | 0.48392 | 0.47144 | 0.45993 | 0.44926 | 0.43935 | 0.43011 | 0.42146 | 0.41334 | 0.40570 | 0.39850 |
| | 0.75 | 0.50789 | 0.49448 | 0.48214 | 0.47073 | 0.46015 | 0.45028 | 0.44107 | 0.43243 | 0.42431 | 0.41666 |
| | 0.80 | 0.53114 | 0.51683 | 0.50368 | 0.49155 | 0.48030 | 0.46984 | 0.46007 | 0.45093 | 0.44234 | 0.43426 |
| | 0.85 | 0.55374 | 0.53855 | 0.52461 | 0.51177 | 0.49988 | 0.48883 | 0.47853 | 0.46889 | 0.45984 | 0.45133 |
| | 0.90 | 0.57575 | 0.55969 | 0.54498 | 0.53144 | 0.51892 | 0.50730 | 0.49647 | 0.48635 | 0.47686 | 0.46794 |
| | 0.95 | 0.59719 | 0.58028 | 0.56482 | 0.55060 | 0.53746 | 0.52528 | 0.51394 | 0.50335 | 0.49343 | 0.48410 |
| | 1.00 | 0.61812 | 0.60038 | 0.58417 | 0.56929 | 0.55555 | 0.54282 | 0.53099 | 0.51993 | 0.50958 | 0.49986 |
| | 1.05 | 0.63856 | 0.62001 | 0.60307 | 0.58754 | 0.57321 | 0.55995 | 0.54762 | 0.53612 | 0.52535 | 0.51525 |
| | 1.10 | 0.65856 | 0.63921 | 0.62156 | 0.60538 | 0.59048 | 0.57669 | 0.56388 | 0.55194 | 0.54076 | 0.53028 |
| | 1.15 | 0.67813 | 0.65799 | 0.63964 | 0.62284 | 0.60737 | 0.59307 | 0.57979 | 0.56741 | 0.55584 | 0.54498 |
| | 1.20 | 0.69731 | 0.67639 | 0.65736 | 0.63994 | 0.62392 | 0.60911 | 0.59536 | 0.58356 | 0.57060 | 0.55938 |
| | 1.25 | 0.71612 | 0.69444 | 0.67473 | 0.65670 | 0.64013 | 0.62483 | 0.61063 | 0.59741 | 0.58506 | 0.57349 |
| | 1.30 | 0.73457 | 0.71214 | 0.69177 | 0.67315 | 0.65604 | 0.64025 | 0.62560 | 0.61198 | 0.59925 | 0.58733 |
| | 1.35 | 0.75268 | 0.72952 | 0.70850 | 0.68929 | 0.67166 | 0.65538 | 0.64030 | 0.62627 | 0.61318 | 0.60091 |
| | 1.40 | 0.77048 | 0.74660 | 0.72493 | 0.70515 | 0.68699 | 0.67025 | 0.65474 | 0.64031 | 0.62685 | 0.61425 |
| | 1.45 | 0.78798 | 0.76338 | 0.74108 | 0.72074 | 0.70207 | 0.68486 | 0.66892 | 0.65411 | 0.64029 | 0.62735 |
| | 1.50 | 0.80520 | 0.77990 | 0.75697 | 0.73606 | 0.71689 | 0.69923 | 0.68288 | 0.66768 | 0.65350 | 0.64024 |
| | 1.55 | 0.82214 | 0.79615 | 0.77260 | 0.75115 | 0.73148 | 0.71337 | 0.69660 | 0.68103 | 0.66651 | 0.65292 |
| | 1.60 | 0.83882 | 0.81214 | 0.78800 | 0.76600 | 0.74584 | 0.72728 | 0.71011 | 0.69417 | 0.67930 | 0.66540 |
| | 1.65 | 0.85525 | 0.82790 | 0.80316 | 0.78062 | 0.75999 | 0.74099 | 0.72342 | 0.70711 | 0.69191 | 0.67769 |
| | 1.70 | 0.87145 | 0.84343 | 0.81810 | 0.79504 | 0.77393 | 0.75450 | 0.73653 | 0.71986 | 0.70433 | 0.68980 |

TABLE I-continued

Torque-Current ($I_{st}$) 2-D Look-up-Table

| | | | | | | | | | | |
|---|---|---|---|---|---|---|---|---|---|---|
| 1.75 | 0.88742 | 0.85874 | 0.83283 | 0.80925 | 0.78766 | 0.76781 | 0.74946 | 0.73243 | 0.71657 | 0.70174 |
| 1.80 | 0.90316 | 0.87384 | 0.84735 | 0.82326 | 0.80121 | 0.78094 | 0.76221 | 0.74482 | 0.72864 | 0.71351 |
| 1.85 | 0.91870 | 0.88874 | 0.86168 | 0.83708 | 0.81458 | 0.79389 | 0.77478 | 0.75705 | 0.74054 | 0.72512 |
| 1.90 | 0.93404 | 0.90345 | 0.87593 | 0.85073 | 0.82777 | 0.80667 | 0.78719 | 0.76911 | 0.75229 | 0.73658 |
| 1.95 | 0.94919 | 0.91797 | 0.88979 | 0.86420 | 0.84080 | 0.81929 | 0.79944 | 0.78103 | 0.76389 | 0.74789 |
| 2.00 | 0.96414 | 0.93230 | 0.90358 | 0.87750 | 0.85366 | 0.83175 | 0.81153 | 0.79279 | 0.77534 | 0.75905 |

TABLE II

$I_d$ per unit 2-D Look-up-Table

| | | \multicolumn{10}{c}{$K = (L_q/L_d - 1)$} |
|---|---|---|---|---|---|---|---|---|---|---|---|

| | | 0.00 | 0.25 | 0.50 | 0.75 | 1.00 | 1.25 | 1.50 | 1.75 | 2.00 | 2.25 | 2.50 |
|---|---|---|---|---|---|---|---|---|---|---|---|---|
| $I_{st}$ per unit | 0.000 | 0.00000 | 0.00000 | 0.00000 | 0.00000 | 0.00000 | 0.00000 | 0.00000 | 0.00000 | 0.00000 | 0.00000 | 0.00000 |
| ($I^{st}$ peak/ldf) | 0.025 | 0.00000 | 0.00016 | 0.00031 | 0.00047 | 0.00062 | 0.00078 | 0.00093 | 0.00109 | 0.00124 | 0.00140 | 0.00155 |
| (ldf = Flux Linkage/Ld) | 0.050 | 0.00000 | 0.00062 | 0.00125 | 0.00187 | 0.00249 | 0.00310 | 0.00371 | 0.00431 | 0.00490 | 0.00549 | 0.00607 |
| | 0.075 | 0.00000 | 0.00141 | 0.00280 | 0.00419 | 0.00556 | 0.00691 | 0.00823 | 0.00953 | 0.01078 | 0.01201 | 0.01319 |
| | 0.100 | 0.00000 | 0.00250 | 0.00498 | 0.00742 | 0.00981 | 0.01213 | 0.01438 | 0.01654 | 0.01861 | 0.02059 | 0.02247 |
| | 0.125 | 0.00000 | 0.00390 | 0.00775 | 0.01152 | 0.01517 | 0.01866 | 0.02199 | 0.02513 | 0.02809 | 0.03087 | 0.03346 |
| | 0.150 | 0.00000 | 0.00561 | 0.01113 | 0.01647 | 0.02157 | 0.02638 | 0.03089 | 0.03507 | 0.03894 | 0.04250 | 0.04577 |
| | 0.175 | 0.00000 | 0.00763 | 0.01508 | 0.02223 | 0.02895 | 0.03519 | 0.04092 | 0.04614 | 0.05089 | 0.05520 | 0.05910 |
| | 0.200 | 0.00000 | 0.00995 | 0.01962 | 0.02876 | 0.03723 | 0.04495 | 0.05191 | 0.05816 | 0.06375 | 0.06874 | 0.07321 |
| | 0.225 | 0.00000 | 0.01258 | 0.02470 | 0.03602 | 0.04633 | 0.05556 | 0.06375 | 0.07097 | 0.07733 | 0.08295 | 0.08792 |
| | 0.250 | 0.00000 | 0.01550 | 0.03033 | 0.04397 | 0.05619 | 0.06693 | 0.07629 | 0.08443 | 0.09151 | 0.09768 | 0.10310 |
| | 0.275 | 0.00000 | 0.01873 | 0.03648 | 0.05257 | 0.06672 | 0.07895 | 0.08944 | 0.09843 | 0.10617 | 0.11285 | 0.11866 |
| | 0.300 | 0.00000 | 0.02225 | 0.04314 | 0.06178 | 0.07787 | 0.09155 | 0.10311 | 0.11289 | 0.12122 | 0.12836 | 0.13452 |
| | 0.325 | 0.00000 | 0.02607 | 0.05028 | 0.07154 | 0.08958 | 0.10465 | 0.11722 | 0.12774 | 0.13661 | 0.14415 | 0.15062 |
| | 0.350 | 0.00000 | 0.03017 | 0.05790 | 0.08183 | 0.10178 | 0.11820 | 0.13171 | 0.14290 | 0.15226 | 0.16017 | 0.16693 |
| | 0.375 | 0.00000 | 0.03456 | 0.06596 | 0.09261 | 0.11443 | 0.13213 | 0.14653 | 0.15834 | 0.16815 | 0.17639 | 0.18339 |
| | 0.400 | 0.00000 | 0.03923 | 0.07446 | 0.10383 | 0.12749 | 0.14641 | 0.16163 | 0.17402 | 0.18423 | 0.19277 | 0.20000 |
| | 0.425 | 0.00000 | 0.04418 | 0.08336 | 0.11547 | 0.14091 | 0.16099 | 0.17698 | 0.18989 | 0.20048 | 0.20929 | 0.21672 |
| | 0.450 | 0.00000 | 0.04940 | 0.09266 | 0.12749 | 0.15466 | 0.17583 | 0.19254 | 0.20594 | 0.21687 | 0.22593 | 0.23354 |
| | 0.475 | 0.00000 | 0.05490 | 0.10234 | 0.13987 | 0.16870 | 0.19091 | 0.20829 | 0.22214 | 0.23338 | 0.24267 | 0.25045 |
| | 0.500 | 0.00000 | 0.06066 | 0.11237 | 0.15258 | 0.18301 | 0.20620 | 0.22420 | 0.23847 | 0.25000 | 0.25949 | 0.26742 |
| | 0.525 | 0.00000 | 0.06668 | 0.12275 | 0.16559 | 0.19756 | 0.22168 | 0.24026 | 0.25491 | 0.26671 | 0.27639 | 0.28446 |
| | 0.550 | 0.00000 | 0.07296 | 0.13344 | 0.17888 | 0.21233 | 0.23732 | 0.25645 | 0.27146 | 0.28350 | 0.29336 | 0.30156 |
| | 0.575 | 0.00000 | 0.07950 | 0.14445 | 0.19243 | 0.22730 | 0.25311 | 0.27275 | 0.28810 | 0.30037 | 0.31038 | 0.31870 |
| | 0.600 | 0.00000 | 0.08628 | 0.15574 | 0.20621 | 0.24244 | 0.26904 | 0.28916 | 0.30481 | 0.31730 | 0.32746 | 0.33589 |
| | 0.625 | 0.00000 | 0.09330 | 0.16732 | 0.22022 | 0.25775 | 0.28509 | 0.30566 | 0.32160 | 0.33428 | 0.34458 | 0.35311 |
| | 0.650 | 0.00000 | 0.10057 | 0.17915 | 0.23444 | 0.27321 | 0.30125 | 0.32224 | 0.33845 | 0.35131 | 0.36175 | 0.37037 |
| | 0.675 | 0.00000 | 0.10807 | 0.19124 | 0.24884 | 0.28881 | 0.31751 | 0.33889 | 0.35536 | 0.36839 | 0.37895 | 0.38766 |
| | 0.700 | 0.00000 | 0.11580 | 0.20356 | 0.26342 | 0.30453 | 0.33385 | 0.35561 | 0.37232 | 0.38551 | 0.39618 | 0.40498 |
| | 0.725 | 0.00000 | 0.12375 | 0.21611 | 0.27816 | 0.32036 | 0.35028 | 0.37240 | 0.38933 | 0.40267 | 0.41344 | 0.42231 |
| | 0.750 | 0.00000 | 0.13192 | 0.22887 | 0.29305 | 0.33630 | 0.36679 | 0.38924 | 0.40638 | 0.41986 | 0.43073 | 0.43968 |
| | 0.775 | 0.00000 | 0.14031 | 0.24183 | 0.30809 | 0.35234 | 0.38336 | 0.40612 | 0.42346 | 0.43708 | 0.44805 | 0.45706 |
| | 0.800 | 0.00000 | 0.14891 | 0.25498 | 0.32326 | 0.36847 | 0.40000 | 0.42306 | 0.44059 | 0.45433 | 0.46538 | 0.47446 |
| | 0.825 | 0.00000 | 0.15772 | 0.26832 | 0.33855 | 0.38468 | 0.41669 | 0.44004 | 0.45774 | 0.47160 | 0.48274 | 0.49187 |
| | 0.850 | 0.00000 | 0.16673 | 0.28182 | 0.35395 | 0.40096 | 0.43344 | 0.45705 | 0.47493 | 0.48890 | 0.50011 | 0.50930 |
| | 0.875 | 0.00000 | 0.17593 | 0.29550 | 0.36946 | 0.41732 | 0.45024 | 0.47411 | 0.49214 | 0.50622 | 0.51750 | 0.52675 |
| | 0.900 | 0.00000 | 0.18533 | 0.30932 | 0.38508 | 0.43374 | 0.46708 | 0.49119 | 0.50938 | 0.52356 | 0.53491 | 0.54420 |
| | 0.925 | 0.00000 | 0.19491 | 0.32329 | 0.40078 | 0.45022 | 0.48397 | 0.50831 | 0.52664 | 0.54091 | 0.55233 | 0.56167 |
| | 0.950 | 0.00000 | 0.20468 | 0.33741 | 0.41657 | 0.46676 | 0.50089 | 0.52545 | 0.54392 | 0.55828 | 0.56977 | 0.57915 |
| | 0.975 | 0.00000 | 0.21462 | 0.35165 | 0.43245 | 0.48336 | 0.51785 | 0.54262 | 0.56122 | 0.57567 | 0.58721 | 0.59664 |
| | 1.000 | 0.00000 | 0.22474 | 0.36603 | 0.44840 | 0.50000 | 0.53485 | 0.55982 | 0.57854 | 0.59307 | 0.60467 | 0.61414 |

| | | \multicolumn{9}{c}{$K = (L_q/L_d - 1)$} |
|---|---|---|---|---|---|---|---|---|---|---|

| | | 2.75 | 3.00 | 3.25 | 3.50 | 3.75 | 4.00 | 4.25 | 4.50 | 4.75 | 5.00 |
|---|---|---|---|---|---|---|---|---|---|---|---|
| $I_{st}$ per unit | 0.000 | 0.00000 | 0.00000 | 0.00000 | 0.00000 | 0.00000 | 0.00000 | 0.00000 | 0.00000 | 0.00000 | 0.00000 |
| ($I^{st}$ peak/ldf) | 0.025 | 0.00170 | 0.00185 | 0.00201 | 0.00215 | 0.00230 | 0.00245 | 0.00260 | 0.00274 | 0.00289 | 0.00303 |
| (ldf = Flux Linkage/Ld) | 0.050 | 0.00663 | 0.00719 | 0.00774 | 0.00827 | 0.00879 | 0.00931 | 0.00981 | 0.01030 | 0.01077 | 0.01124 |
| | 0.075 | 0.01434 | 0.01544 | 0.01651 | 0.01754 | 0.01852 | 0.01947 | 0.02038 | 0.02125 | 0.02209 | 0.02289 |
| | 0.100 | 0.02426 | 0.02596 | 0.02756 | 0.02908 | 0.03052 | 0.03187 | 0.3316 | 0.03437 | 0.03552 | 0.03660 |
| | 0.125 | 0.03589 | 0.03814 | 0.04025 | 0.04221 | 0.04404 | 0.04575 | 0.04735 | 0.04884 | 0.05024 | 0.05155 |
| | 0.150 | 0.04879 | 0.05155 | 0.05410 | 0.05645 | 0.05861 | 0.06061 | 0.06246 | 0.06418 | 0.06577 | 0.06726 |
| | 0.175 | 0.06264 | 0.06585 | 0.06878 | 0.07145 | 0.07389 | 0.07613 | 0.07819 | 0.08009 | 0.08184 | 0.08346 |
| | 0.200 | 0.07721 | 0.08081 | 0.08406 | 0.08701 | 0.08968 | 0.09212 | 0.09434 | 0.09639 | 0.09827 | 0.10000 |
| | 0.225 | 0.09233 | 0.09627 | 0.09980 | 0.10297 | 0.10584 | 0.10843 | 0.11080 | 0.11296 | 0.11495 | 0.11677 |
| | 0.250 | 0.10787 | 0.11210 | 0.11586 | 0.11923 | 0.12226 | 0.12500 | 0.12748 | 0.12975 | 0.13181 | 0.13371 |
| | 0.275 | 0.12375 | 0.12823 | 0.13219 | 0.13573 | 0.13890 | 0.14175 | 0.14433 | 0.14668 | 0.14882 | 0.15078 |
| | 0.300 | 0.13988 | 0.14458 | 0.14873 | 0.15241 | 0.15569 | 0.15865 | 0.16131 | 0.16373 | 0.16593 | 0.16794 |

TABLE II-continued $I_d$ per unit 2-D Look-up-Table

| | | | | | | | | | | |
|---|---|---|---|---|---|---|---|---|---|---|
| 0.325 | 0.15623 | 0.16112 | 0.16542 | 0.16923 | 0.17262 | 0.17566 | 0.17840 | 0.18087 | 0.18313 | 0.18519 |
| 0.350 | 0.17275 | 0.17781 | 0.18224 | 0.18616 | 0.18964 | 0.19276 | 0.19556 | 0.19809 | 0.20039 | 0.20249 |
| 0.375 | 0.18941 | 0.19462 | 0.19917 | 0.20319 | 0.20675 | 0.20993 | 0.21279 | 0.21537 | 0.21771 | 0.21984 |
| 0.400 | 0.20618 | 0.21153 | 0.21619 | 0.22029 | 0.22393 | 0.22717 | 0.23007 | 0.23269 | 0.23507 | 0.23723 |
| 0.425 | 0.22306 | 0.22853 | 0.23329 | 0.23746 | 0.24116 | 0.24445 | 0.24740 | 0.25006 | 0.25246 | 0.25465 |
| 0.450 | 0.24002 | 0.24560 | 0.25044 | 0.25469 | 0.25844 | 0.26178 | 0.26477 | 0.26746 | 0.26989 | 0.27210 |
| 0.475 | 0.25705 | 0.26273 | 0.26765 | 0.27196 | 0.27576 | 0.27914 | 0.28216 | 0.28488 | 0.28734 | 0.28958 |
| 0.500 | 0.27414 | 0.27991 | 0.28490 | 0.28927 | 0.29312 | 0.29654 | 0.29959 | 0.30234 | 0.30482 | 0.30707 |
| 0.525 | 0.29129 | 0.29714 | 0.30219 | 0.30661 | 0.31050 | 0.31396 | 0.31704 | 0.31981 | 0.32231 | 0.32458 |
| 0.550 | 0.30848 | 0.31440 | 0.31952 | 0.32399 | 0.32791 | 0.33140 | 0.33451 | 0.33730 | 0.33982 | 0.34211 |
| 0.575 | 0.32572 | 0.33171 | 0.33688 | 0.34138 | 0.34535 | 0.34886 | 0.35200 | 0.35481 | 0.35735 | 0.35965 |
| 0.600 | 0.34299 | 0.34904 | 0.35426 | 0.35881 | 0.36280 | 0.36634 | 0.36950 | 0.37233 | 0.37488 | 0.37720 |
| 0.625 | 0.36029 | 0.36640 | 0.37166 | 0.37625 | 0.38028 | 0.38384 | 0.38702 | 0.38986 | 0.39243 | 0.39476 |
| 0.650 | 0.37761 | 0.38378 | 0.38909 | 0.39371 | 0.39776 | 0.40135 | 0.40454 | 0.40741 | 0.40999 | 0.41233 |
| 0.675 | 0.39497 | 0.40118 | 0.40653 | 0.41118 | 0.41526 | 0.41887 | 0.42208 | 0.42496 | 0.42756 | 0.42991 |
| 0.700 | 0.41234 | 0.41861 | 0.42399 | 0.42867 | 0.43278 | 0.43641 | 0.43963 | 0.44253 | 0.44513 | 0.44749 |
| 0.725 | 0.42974 | 0.43605 | 0.44147 | 0.44618 | 0.45030 | 0.45395 | 0.45719 | 0.46010 | 0.46272 | 0.46508 |
| 0.750 | 0.44716 | 0.45350 | 0.45896 | 0.46369 | 0.46784 | 0.47150 | 0.47476 | 0.47768 | 0.48030 | 0.48269 |
| 0.775 | 0.46459 | 0.47097 | 0.47646 | 0.48121 | 0.48538 | 0.48906 | 0.49233 | 0.49526 | 0.49790 | 0.50028 |
| 0.800 | 0.48203 | 0.48846 | 0.49397 | 0.49875 | 0.50293 | 0.50663 | 0.50991 | 0.51285 | 0.51550 | 0.51789 |
| 0.825 | 0.49949 | 0.50595 | 0.51149 | 0.51629 | 0.52049 | 0.52420 | 0.52750 | 0.53045 | 0.53310 | 0.53550 |
| 0.850 | 0.51697 | 0.52346 | 0.52902 | 0.53384 | 0.53806 | 0.54178 | 0.54509 | 0.54805 | 0.55071 | 0.55312 |
| 0.875 | 0.53445 | 0.54097 | 0.54656 | 0.55140 | 0.55563 | 0.55937 | 0.56268 | 0.56565 | 0.56832 | 0.57074 |
| 0.900 | 0.55195 | 0.55850 | 0.56411 | 0.56896 | 0.57321 | 0.57696 | 0.58029 | 0.58326 | 0.58594 | 0.58836 |
| 0.925 | 0.56945 | 0.57603 | 0.58166 | 0.58653 | 0.59080 | 0.59455 | 0.59789 | 0.60087 | 0.60356 | 0.60598 |
| 0.950 | 0.58697 | 0.59357 | 0.59922 | 0.60411 | 0.60838 | 0.61215 | 0.61550 | 0.61849 | 0.62118 | 0.62361 |
| 0.975 | 0.60449 | 0.61111 | 0.61678 | 0.62169 | 0.62598 | 0.62976 | 0.63311 | 0.63611 | 0.63880 | 0.64124 |
| 1.000 | 0.62202 | 0.62867 | 0.63436 | 0.63928 | 0.64358 | 0.64736 | 0.45073 | 0.65373 | 0.65643 | 0.65887 |

TABLE III $I_q$ per unit 2-D Look-up-Table

| | | $K = (L_q/L_d - 1)$ | | | | | | | | | |
|---|---|---|---|---|---|---|---|---|---|---|---|
| | | 0.00 | 0.25 | 0.50 | 0.75 | 1.00 | 1.25 | 1.50 | 1.75 | 2.00 | 2.25 | 2.50 |
| $I_{st}$ per unit | 0.000 | 0.00000 | 0.00000 | 0.00000 | 0.00000 | 0.00000 | 0.00000 | 0.00000 | 0.00000 | 0.00000 | 0.00000 |
| ($I^{st}$ peak/ldf) | 0.025 | 0.02500 | 0.02500 | 0.02500 | 0.02500 | 0.02499 | 0.02499 | 0.02498 | 0.02498 | 0.02497 | 0.02496 | 0.02495 |
| (ldf = Flux Linkage/Ld) | 0.050 | 0.05000 | 0.05000 | 0.04998 | 0.04997 | 0.04994 | 0.04990 | 0.04986 | 0.04981 | 0.04976 | 0.04970 | 0.04963 |
| | 0.075 | 0.07500 | 0.07499 | 0.07495 | 0.07488 | 0.07479 | 0.07468 | 0.07455 | 0.07439 | 0.07422 | 0.07403 | 0.07383 |
| | 0.100 | 0.10000 | 0.09997 | 0.09988 | 0.09972 | 0.09952 | 0.09926 | 0.09896 | 0.09862 | 0.09825 | 0.09786 | 0.09744 |
| | 0.125 | 0.12500 | 0.12494 | 0.12476 | 0.12447 | 0.12408 | 0.12360 | 0.12305 | 0.12245 | 0.12180 | 0.12113 | 0.12044 |
| | 0.150 | 0.15000 | 0.14990 | 0.14959 | 0.14909 | 0.14844 | 0.14766 | 0.14679 | 0.14584 | 0.14486 | 0.14385 | 0.14285 |
| | 0.175 | 0.17500 | 0.17483 | 0.17435 | 0.17358 | 0.17259 | 0.17143 | 0.17015 | 0.16881 | 0.16744 | 0.16607 | 0.16472 |
| | 0.200 | 0.20000 | 0.19975 | 0.19904 | 0.19792 | 0.19650 | 0.19488 | 0.19314 | 0.19136 | 0.18957 | 0.18782 | 0.18612 |
| | 0.225 | 0.22500 | 0.22465 | 0.22364 | 0.22210 | 0.22018 | 0.21803 | 0.21578 | 0.21352 | 0.21129 | 0.20915 | 0.20711 |
| | 0.250 | 0.25000 | 0.24952 | 0.24815 | 0.24610 | 0.24360 | 0.24088 | 0.23808 | 0.23531 | 0.23265 | 0.23013 | 0.22775 |
| | 0.275 | 0.27500 | 0.27436 | 0.27257 | 0.26993 | 0.26678 | 0.26342 | 0.26005 | 0.25678 | 0.25368 | 0.25078 | 0.24808 |
| | 0.300 | 0.30000 | 0.29917 | 0.29668 | 0.29357 | 0.28972 | 0.28569 | 0.28172 | 0.27795 | 0.27442 | 0.27115 | 0.26815 |
| | 0.325 | 0.32500 | 0.32395 | 0.32109 | 0.31703 | 0.31241 | 0.30769 | 0.30313 | 0.29885 | 0.29490 | 0.29128 | 0.28799 |
| | 0.350 | 0.35000 | 0.34870 | 0.34518 | 0.34030 | 0.33487 | 0.32944 | 0.32427 | 0.31950 | 0.31514 | 0.31120 | 0.30763 |
| | 0.375 | 0.37500 | 0.37340 | 0.36915 | 0.36339 | 0.35711 | 0.35095 | 0.34519 | 0.33993 | 0.33519 | 0.33092 | 0.32710 |
| | 0.400 | 0.40000 | 0.39807 | 0.39301 | 0.38629 | 0.37914 | 0.37224 | 0.36589 | 0.36016 | 0.35505 | 0.35048 | 0.34641 |
| | 0.425 | 0.43500 | 0.42270 | 0.41674 | 0.40901 | 0.40096 | 0.39333 | 0.38640 | 0.38022 | 0.37474 | 0.36989 | 0.36559 |
| | 0.450 | 0.45000 | 0.44728 | 0.44036 | 0.43156 | 0.42259 | 0.41423 | 0.40673 | 0.40011 | 0.39429 | 0.38917 | 0.38465 |
| | 0.475 | 0.47500 | 0.47182 | 0.46384 | 0.45394 | 0.44403 | 0.43495 | 0.42690 | 0.41986 | 0.41371 | 0.40834 | 0.40361 |
| | 0.500 | 0.50000 | 0.49631 | 0.48721 | 0.47615 | 0.46530 | 0.45550 | 0.44692 | 0.43947 | 0.43301 | 0.42739 | 0.42247 |
| | 0.525 | 0.52500 | 0.52075 | 0.51045 | 0.49820 | 0.48641 | 0.47590 | 0.46680 | 0.45896 | 0.45221 | 0.44636 | 0.44125 |
| | 0.550 | 0.55000 | 0.54514 | 0.53357 | 0.52010 | 0.50736 | 0.49616 | 0.48655 | 0.47834 | 0.47130 | 0.46523 | 0.45996 |
| | 0.575 | 0.57500 | 0.56948 | 0.55656 | 0.54185 | 0.52817 | 0.51629 | 0.50619 | 0.49762 | 0.49031 | 0.48403 | 0.47859 |
| | 0.600 | 0.60000 | 0.59376 | 0.57943 | 0.56345 | 0.54884 | 0.53630 | 0.52572 | 0.51681 | 0.50924 | 0.50276 | 0.49717 |
| | 0.625 | 0.62500 | 0.61800 | 0.60219 | 0.58492 | 0.56938 | 0.55619 | 0.54516 | 0.53591 | 0.52809 | 0.52143 | 0.51569 |
| | 0.650 | 0.65000 | 0.64217 | 0.62482 | 0.60625 | 0.58979 | 0.57598 | 0.56450 | 0.55493 | 0.54688 | 0.54004 | 0.53416 |
| | 0.675 | 0.67500 | 0.66629 | 0.64734 | 0.62746 | 0.61009 | 0.59566 | 0.58376 | 0.57389 | 0.56561 | 0.55859 | 0.55258 |
| | 0.700 | 0.70000 | 0.69036 | 0.66975 | 0.64855 | 0.63029 | 0.61526 | 0.60294 | 0.59277 | 0.58428 | 0.57710 | 0.57096 |
| | 0.725 | 0.72500 | 0.71436 | 0.69204 | 0.66952 | 0.65038 | 0.63476 | 0.62205 | 0.61160 | 0.60289 | 0.59556 | 0.58930 |
| | 0.750 | 0.75000 | 0.73831 | 0.71423 | 0.69038 | 0.67037 | 0.65419 | 0.64109 | 0.63036 | 0.62146 | 0.61398 | 0.60761 |
| | 0.775 | 0.77500 | 0.76219 | 0.73630 | 0.71113 | 0.69028 | -.67354 | 0.66007 | 0.64908 | 0.63999 | 0.63236 | 0.62588 |
| | 0.800 | 0.80000 | 0.78602 | 0.75828 | 0.73178 | 0.71009 | 0.69282 | 0.67898 | 0.66774 | 0.65847 | 0.65071 | 0.64412 |
| | 0.825 | 0.82500 | 0.80978 | 0.78015 | 0.75234 | 0.72983 | 0.71203 | 0.69785 | 0.68636 | 0.67691 | 0.66902 | 0.66233 |
| | 0.850 | 0.85000 | 0.83349 | 0.80192 | 0.77280 | 0.74949 | 0.73118 | 0.71666 | 0.70494 | 0.69532 | 0.68730 | 0.68052 |
| | 0.875 | 0.87500 | 0.85731 | 0.82359 | 0.79317 | 0.76907 | 0.75027 | 0.73542 | 0.72348 | 0.71370 | 0.70556 | 0.69869 |
| | 0.900 | 0.90000 | 0.88071 | 0.84517 | 0.81346 | 0.78859 | 0.76931 | 0.75414 | 0.74198 | 0.73204 | 0.72379 | 0.71683 |

TABLE III-continued $I_q$ per unit 2-D Look-up-Table

| | | | | | | | | | | | |
|---|---|---|---|---|---|---|---|---|---|---|---|
| | 0.925 | 0.92500 | 0.90423 | 0.86666 | 0.83367 | 0.80804 | 0.78829 | 0.77282 | 0.76045 | 0.75036 | 0.74199 | 0.73495 |
| | 0.950 | 0.95000 | 0.92769 | 0.88806 | 0.85380 | 0.82742 | 0.80722 | 0.79145 | 0.77888 | 0.76865 | 0.76017 | 0.75305 |
| | 0.975 | 0.97500 | 0.95108 | 0.90938 | 0.87385 | 0.84675 | 0.82611 | 0.81005 | 0.79728 | 0.78691 | 0.77833 | 0.77113 |
| | 1.000 | 1.00000 | 0.97442 | 0.93060 | 0.89383 | 0.86603 | 0.84495 | 0.82862 | 0.81566 | 0.80515 | 0.79647 | 0.78919 |

| | | $K = (L_q/L_d - 1)$ | | | | | | | | | |
|---|---|---|---|---|---|---|---|---|---|---|---|
| | | 2.75 | 3.00 | 3.25 | 3.50 | 3.75 | 4.00 | 4.25 | 4.50 | 4.75 | 5.00 |
| $I_{st}$ per unit | 0.000 | 0.00000 | 0.00000 | 0.00000 | 0.00000 | 0.00000 | 0.00000 | 0.00000 | 0.00000 | 0.00000 | 0.00000 |
| ($I^{st}$ peak/Idf) | 0.025 | 0.02494 | 0.02493 | 0.02492 | 0.02491 | 0.02489 | 0.02488 | 0.02486 | 0.02485 | 0.02483 | 0.02482 |
| (Idf = Flux Linkage/Ld) | 0.050 | 0.04956 | 0.04948 | 0.04940 | 0.04931 | 0.04922 | 0.04913 | 0.04903 | 0.04893 | 0.04883 | 0.04872 |
| | 0.075 | 0.07362 | 0.07339 | 0.07316 | 0.07292 | 0.07268 | 0.07243 | 0.07218 | 0.07193 | 0.07167 | 0.07142 |
| | 0.100 | 0.09701 | 0.09657 | 0.09613 | 0.09568 | 0.09523 | 0.09478 | 0.09434 | 0.09391 | 0.09348 | 0.09306 |
| | 0.125 | 0.11974 | 0.11904 | 0.11834 | 0.11766 | 0.11698 | 0.11633 | 0.11569 | 0.11506 | 0.11446 | 0.11388 |
| | 0.150 | 0.14185 | 0.14086 | 0.13990 | 0.13897 | 0.13808 | 0.13721 | 0.13638 | 0.13558 | 0.13481 | 0.13407 |
| | 0.175 | 0.16341 | 0.16214 | 0.16092 | 0.15975 | 0.15863 | 0.15757 | 0.15656 | 0.15560 | 0.15468 | 0.15381 |
| | 0.200 | 0.18450 | 0.18295 | 0.18147 | 0.18008 | 0.17877 | 0.17752 | 0.17635 | 0.17524 | 0.17419 | 0.17321 |
| | 0.225 | 0.20518 | 0.20336 | 0.20166 | 0.20006 | 0.19855 | 0.19715 | 0.19583 | 0.19459 | 0.19342 | 0.19233 |
| | 0.250 | 0.22553 | 0.22346 | 0.22153 | 0.21973 | 0.21806 | 0.21651 | 0.21505 | 0.21370 | 0.21243 | 0.21124 |
| | 0.275 | 0.24558 | 0.24328 | 0.24114 | 0.23917 | 0.23734 | 0.23565 | 0.23408 | 0.23262 | 0.23125 | 0.22998 |
| | 0.300 | 0.26539 | 0.26266 | 0.26054 | 0.25840 | 0.25644 | 0.25462 | 0.25294 | 0.25138 | 0.24993 | 0.24858 |
| | 0.325 | 0.28499 | 0.28225 | 0.27975 | 0.27747 | 0.27537 | 0.27344 | 0.27166 | 0.27002 | 0.26849 | 0.26708 |
| | 0.350 | 0.30440 | 0.30147 | 0.29881 | 0.29639 | 0.29417 | 0.29214 | 0.29027 | 0.28855 | 0.28696 | 0.28548 |
| | 0.375 | 0.32365 | 0.32054 | 0.31773 | 0.31518 | 0.31286 | 0.31073 | 0.30878 | 0.30699 | 0.30533 | 0.30380 |
| | 0.400 | 0.34277 | 0.33949 | 0.33654 | 0.33387 | 0.33145 | 0.32924 | 0.32721 | 0.32535 | 0.32364 | 0.32206 |
| | 0.425 | 0.36176 | 0.35833 | 0.35525 | 0.35247 | 0.34995 | 0.34766 | 0.34557 | 0.34365 | 0.34189 | 0.34026 |
| | 0.450 | 0.38064 | 0.37707 | 0.37387 | 0.37099 | 0.36839 | 0.36602 | 0.36387 | 0.36189 | 0.36008 | 0.35841 |
| | 0.475 | 0.39944 | 0.39573 | 0.39241 | 0.38944 | 0.38676 | 0.38432 | 0.38211 | 0.38009 | 0.37823 | 0.37652 |
| | 0.500 | 0.41814 | 0.41431 | 0.41089 | 0.40783 | 0.40507 | 0.40258 | 0.40031 | 0.39824 | 0.39634 | 0.39460 |
| | 0.525 | 0.43678 | 0.43282 | 0.42931 | 0.42616 | 0.42334 | 0.42078 | 0.41846 | 0.41635 | 0.41442 | 0.41264 |
| | 0.550 | 0.45534 | 0.45128 | 0.44767 | 0.44445 | 0.44156 | 0.43895 | 0.43658 | 0.43443 | 0.43246 | 0.43065 |
| | 0.575 | 0.47385 | 0.46968 | 0.46598 | 0.46269 | 0.45974 | 0.45708 | 0.45467 | 0.45248 | 0.45048 | 0.44864 |
| | 0.600 | 0.49230 | 0.48803 | 0.48425 | 0.48089 | 0.47788 | 0.47518 | 0.47273 | 0.47050 | 0.46847 | 0.46660 |
| | 0.625 | 0.51070 | 0.50634 | 0.50249 | 0.49906 | 0.49600 | 0.49325 | 0.49076 | 0.48850 | 0.48644 | 0.48455 |
| | 0.650 | 0.52906 | 0.52461 | 0.52068 | 0.51720 | 0.51409 | 0.51129 | 0.50877 | 0.50648 | 0.50439 | 0.50248 |
| | 0.675 | 0.54738 | 0.54284 | 0.53885 | 0.53531 | 0.53215 | 0.52931 | 0.52675 | 0.52443 | 0.52232 | 0.52039 |
| | 0.700 | 0.56566 | 0.56104 | 0.55698 | 0.55339 | 0.55019 | 0.54731 | 0.54472 | 0.54237 | 0.54024 | 0.53828 |
| | 0.725 | 0.58391 | 0.57921 | 0.57509 | 0.57145 | 0.56820 | 0.56529 | 0.56267 | 0.56030 | 0.55814 | 0.55617 |
| | 0.750 | 0.60212 | 0.59736 | 0.59318 | 0.58948 | 0.58620 | 0.58326 | 0.58061 | 0.57821 | 0.57603 | 0.57404 |
| | 0.775 | 0.62031 | 0.61547 | 0.61124 | 0.60750 | 0.60418 | 0.60120 | 0.59853 | 0.59611 | 0.59390 | 0.59190 |
| | 0.800 | 0.63847 | 0.63357 | 0.62928 | 0.62550 | 0.62214 | 0.61914 | 0.61643 | 0.61399 | 0.61177 | 0.60975 |
| | 0.825 | 0.65660 | 0.65164 | 0.64730 | 0.64348 | 0.64009 | 0.63705 | 0.63433 | 0.63186 | 0.62963 | 0.62758 |
| | 0.850 | 0.67472 | 0.66970 | 0.66531 | 0.66145 | 0.65802 | 0.65496 | 0.65221 | 0.64973 | 0.64747 | 0.64542 |
| | 0.875 | 0.69281 | 0.68773 | 0.68330 | 0.67940 | 0.67594 | 0.67285 | 0.67008 | 0.66758 | 0.66531 | 0.66324 |
| | 0.900 | 0.71088 | 0.70575 | 0.70127 | 0.69734 | 0.69385 | 0.69074 | 0.68795 | 0.68542 | 0.68314 | 0.68105 |
| | 0.925 | 0.72894 | 0.72375 | 0.71923 | 0.71526 | 0.71175 | 0.70861 | 0.70580 | 0.70326 | 0.70096 | 0.69886 |
| | 0.950 | 0.74697 | 0.74174 | 0.73718 | 0.73318 | 0.72964 | 0.72648 | 0.72364 | 0.72109 | 0.71877 | 0.71667 |
| | 0.975 | 0.76500 | 0.75971 | 0.75512 | 0.75108 | 0.74751 | 0.74433 | 0.74148 | 0.73891 | 0.73658 | 0.73446 |
| | 1.000 | 0.78300 | 0.77767 | 0.77304 | 0.76898 | 0.76538 | 0.76218 | 0.75931 | 0.75673 | 0.75439 | 0.75225 |

B. Implementation.

Figure 4:
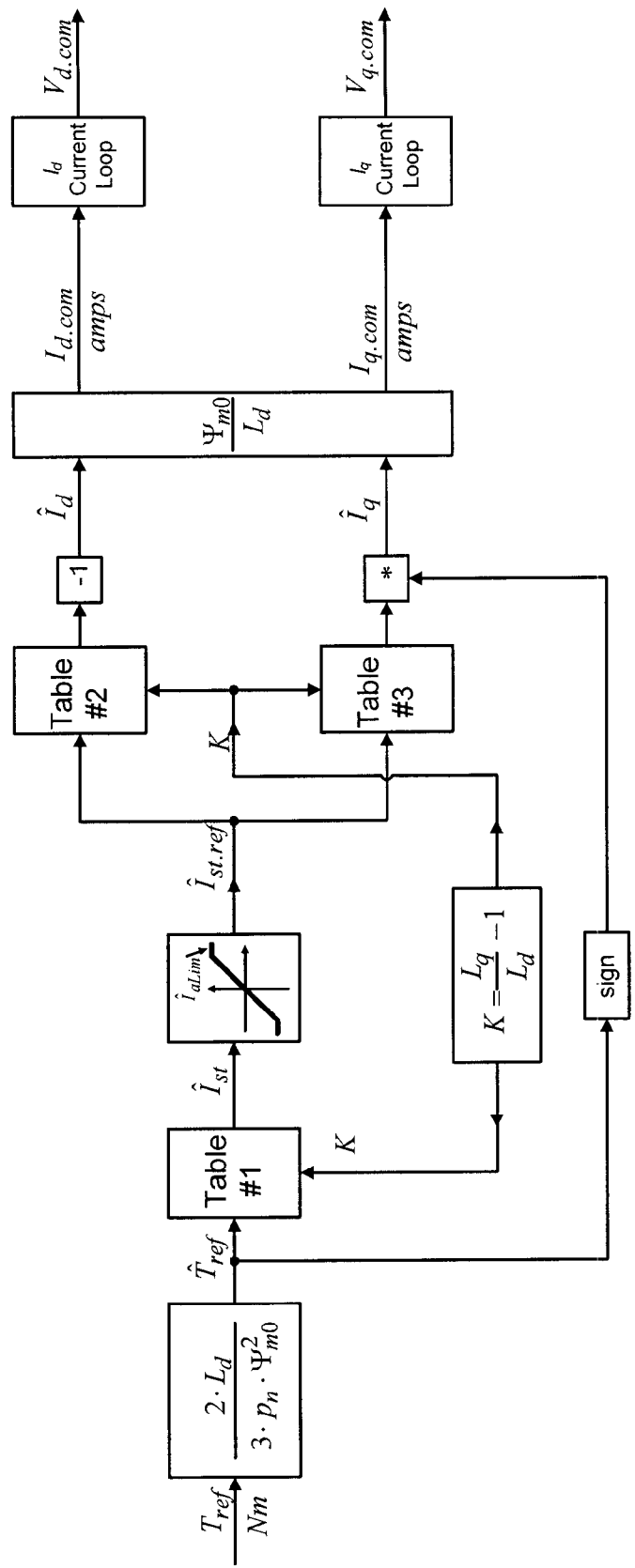
FIG. 4 is a control block diagram of a control system having a torque control loop in torque mode with three lookup tables.

Based on Equations 31-33 a control block diagram for a torque control loop with constant torque mode operation can be developed based on three tables, as illustrated in FIG. 4. As illustrated in FIG. 4, the torque reference unit ($T_{ref}$), which is in Newton meters (Nm), has been converted to torque reference per unit ($\hat{T}_{ref}$) using known values of flux ($\Psi_{m0}$) and direct inductance ($L_d$) of the motor. Using this per-unit torque reference as a first input to the two-dimensional Table I and ratio "K" from equation 25 as a second input to this Table I, optimum per-unit stator current ($\hat{I}_{st}$) is derived as an output of Table I. As illustrated in FIG. 4, the per unit stator current ($\hat{I}_{st}$) is checked for limit and become stator current reference per unit ($\hat{I}_{st.ref}$). Stator current reference per unit ($\hat{I}_{st.ref}$) is now used as a first input for two two-dimensional tables: Table II and Table III. Ratio "K" is then used as a second input for these Table II and Table III. The negated value of the output of Table II is a substantially optimum per-unit direct current ($\hat{I}_d$). The product of the torque sign and output value of Table III is a substantially optimum per-unit quadrature current ($\hat{I}_q$).

Using known values of flux ($\Psi_{m0}$) and direct inductance ($L_d$) of the motor, these per-unit values of current can be converted to command direct current ($I_{d.com}$) and command quadrature current ($I_{q.com}$) in amps. These substantially optimum command currents are used as a reference for conventional current loops.

Figure 5:
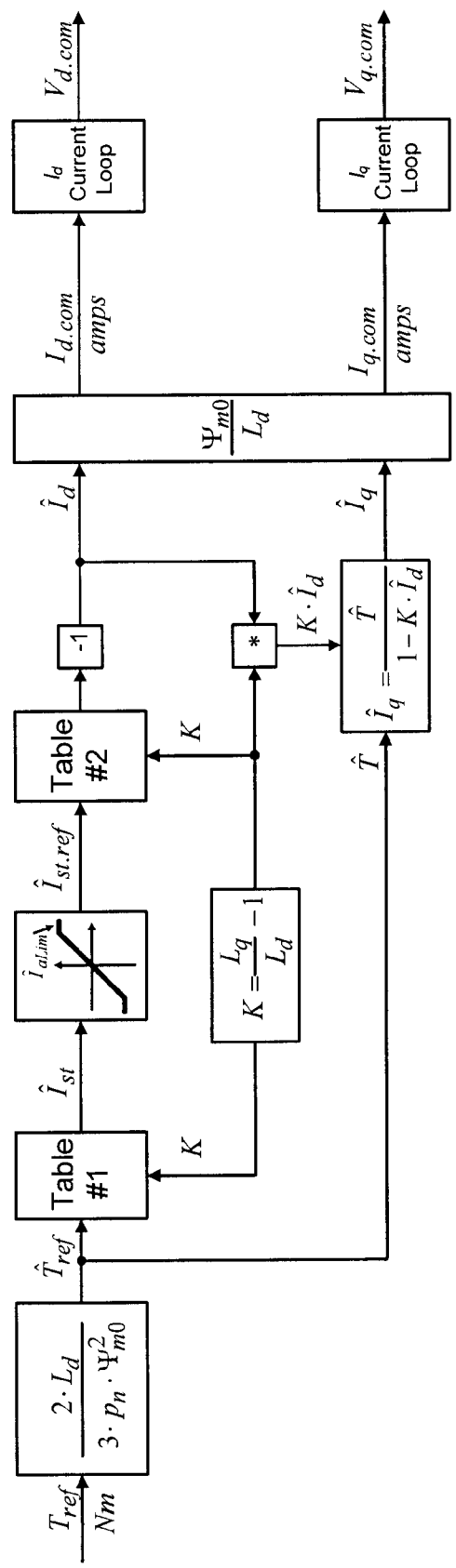
FIG. 5 is a block diagram of a control system having a torque control loop in torque mode with two lookup tables for $I_d$ determination.

Additionally, using Equations 19, 31, and 33, it is possible to derive another control block diagram using only two tables, as illustrated in FIG. 5. This block diagram is similar to the block diagram in FIG. 4. However, the calculation of the quadrature current $\hat{I}_q$ is calculated based on Equation 19. Similarly, it is possible to make another block diagram (not illustrated) based on Equations 19, 32, and 33 using again only two tables.

While the above description details various blocks, steps, and functions, it should be noted that all of these elements are meant to be implemented in software as computer programs and represent algorithms for execution by a conventional-type digital processor adapted for industrial applications.

For example, a motor drive unit 14 and controller 24 illustrated in FIG. 1 can be readily constructed that operates according to the block diagram illustrated in FIG. 4 or in FIG. 5. In this case, only three motor parameters need to be known in order for the motor drive unit 14 and controller 24 to control any of a variety of permanent magnet motors 16. In particular, only the magnetic flux $\Psi_{m0}$, the direct inductance $L_d$, and the quadrature inductance $L_q$ of the motor needs to be known and substantially optimized torque control can be readily performed without reconfiguration of the motor drive unit 14 and controller 24. These parameters can be derived from the specifications of the motor or from an auto-tuning procedure.

Figure 6:
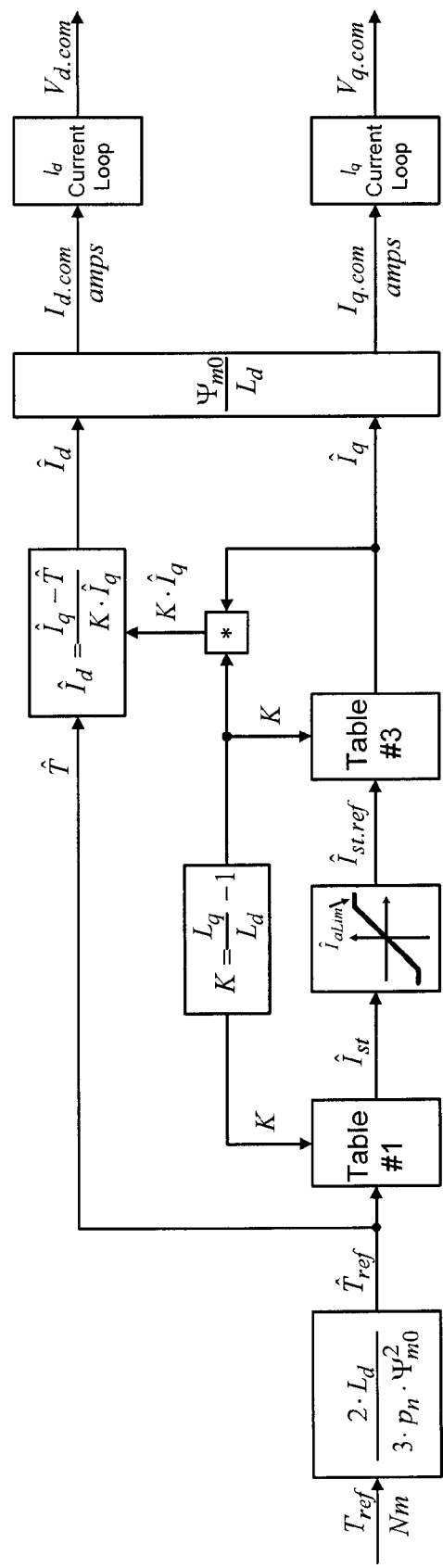
FIG. 6 is a block diagram of a control system having a torque control loop in torque mode with two lookup tables for $I_q$ determination.
Figure 7:
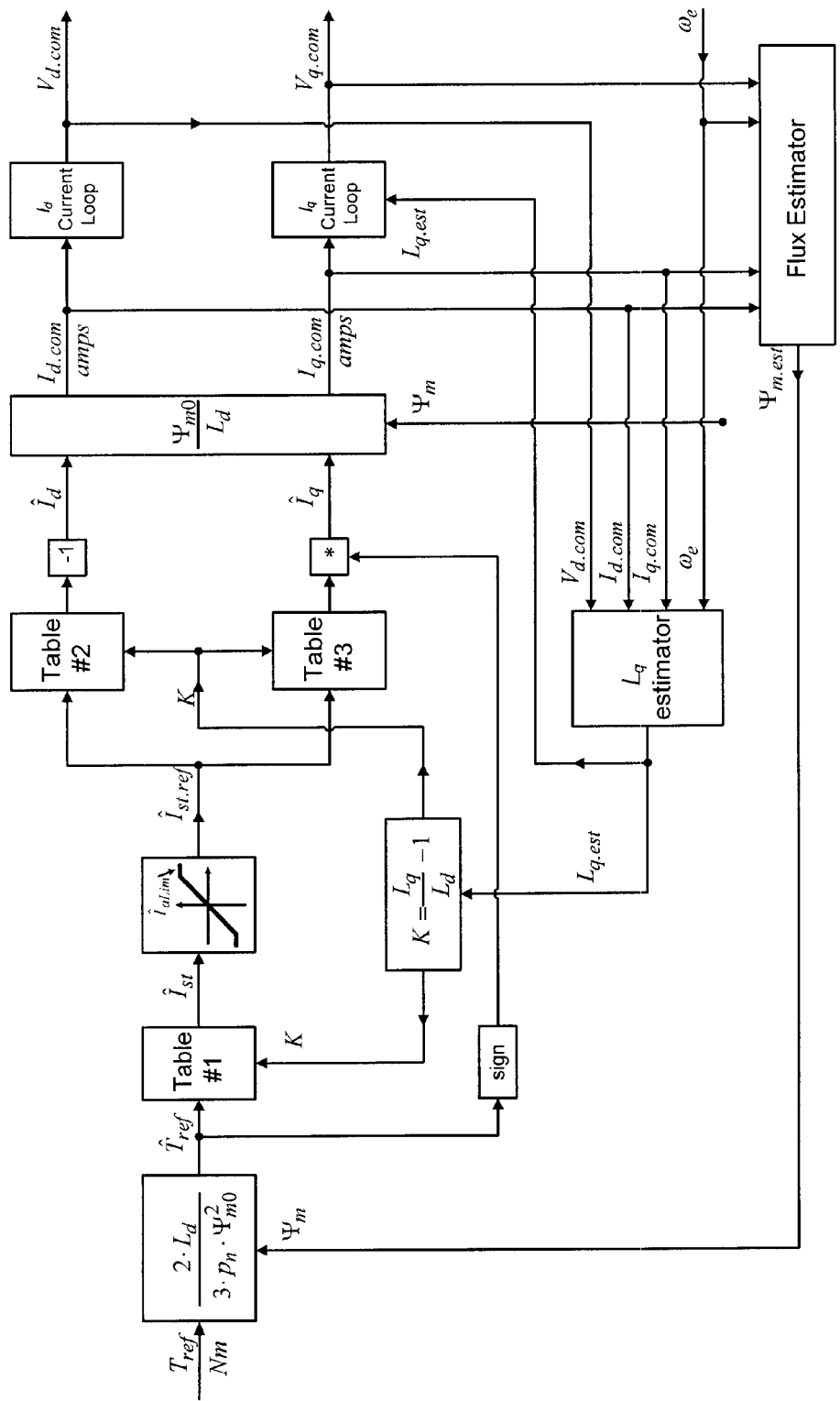
FIG. 7 is a block diagram of a control system having an adaptive torque control loop in torque mode with three lookup tables.
Figure 8:
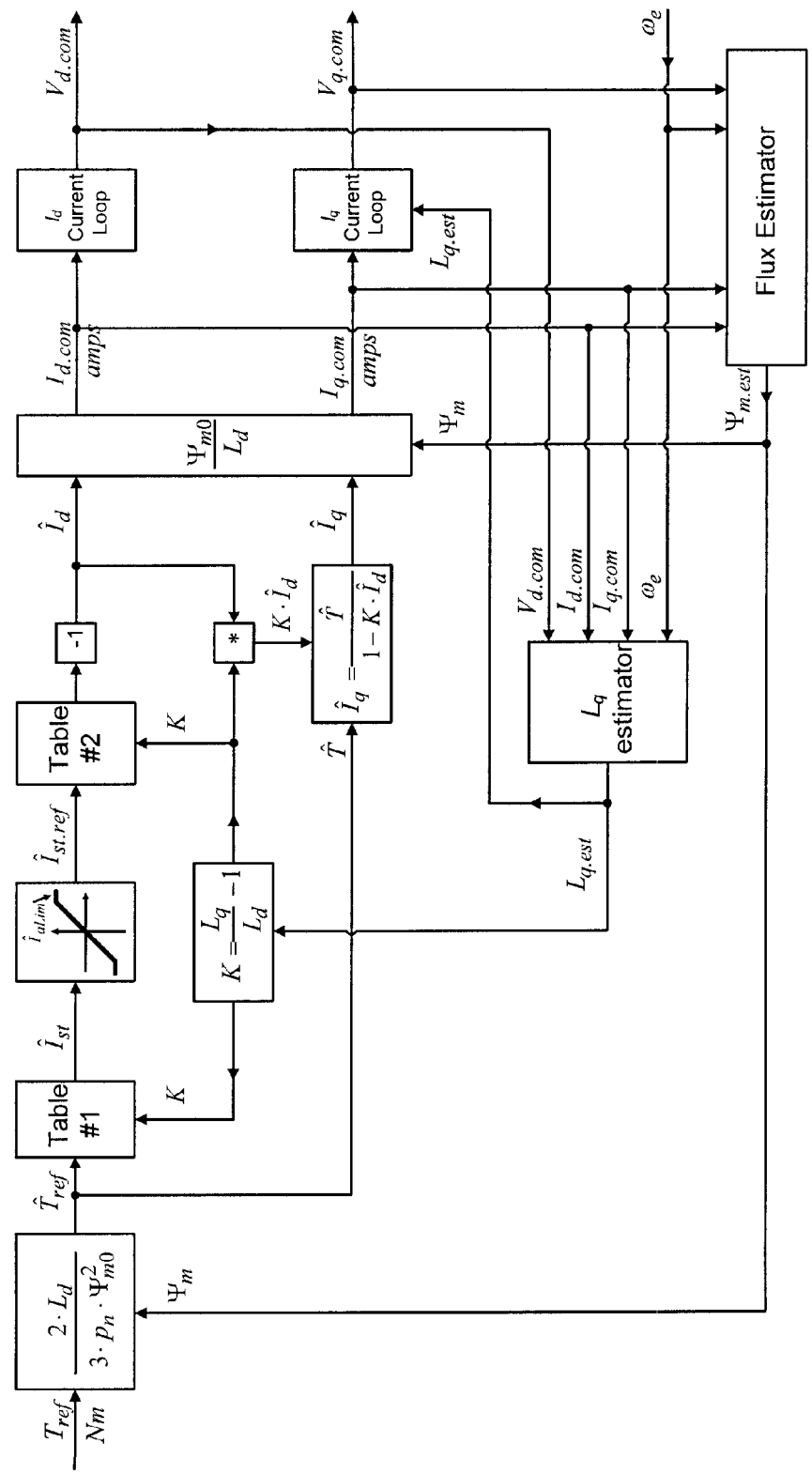
FIG. 8 is a block diagram of a control system having an adaptive torque control loop in torque mode with two lookup tables for $I_d$ determination.
Figure 9:
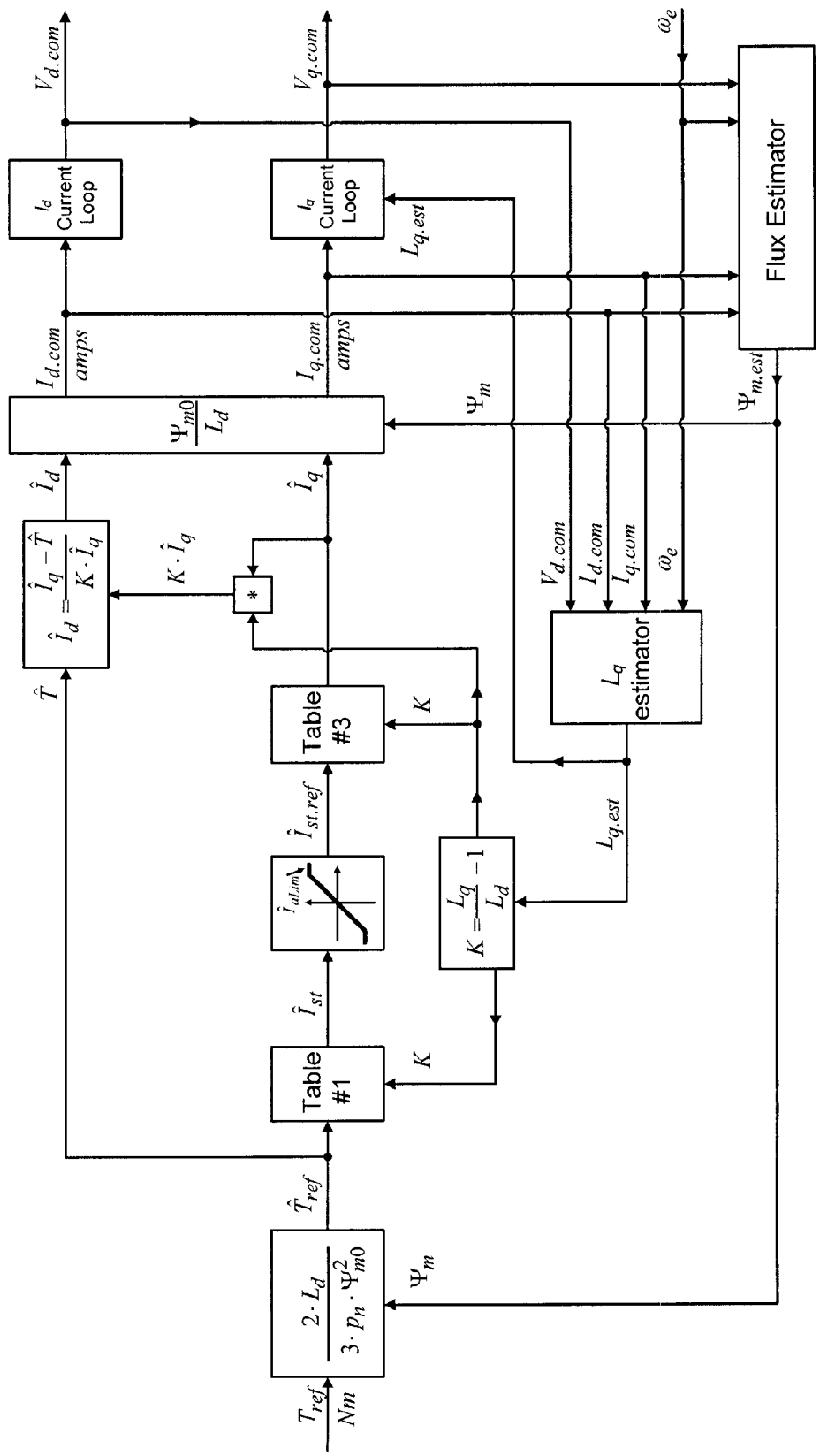
FIG. 9 is a block diagram of a control system having an adaptive torque control loop in torque mode with two lookup tables for $I_q$ determination.
Figure 10:
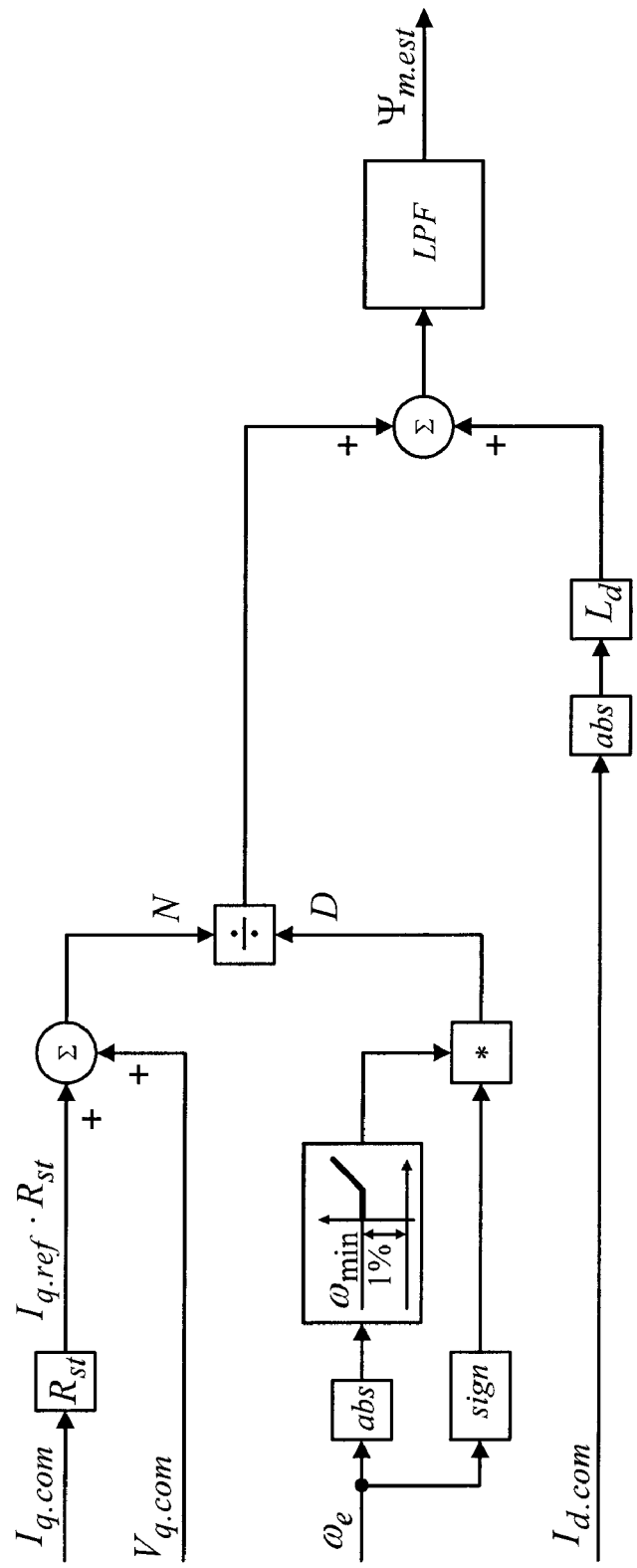
FIG. 10 is a detailed block diagram of the flux estimator included in FIG. 7, FIG. 8 and FIG. 9.
Figure 11:
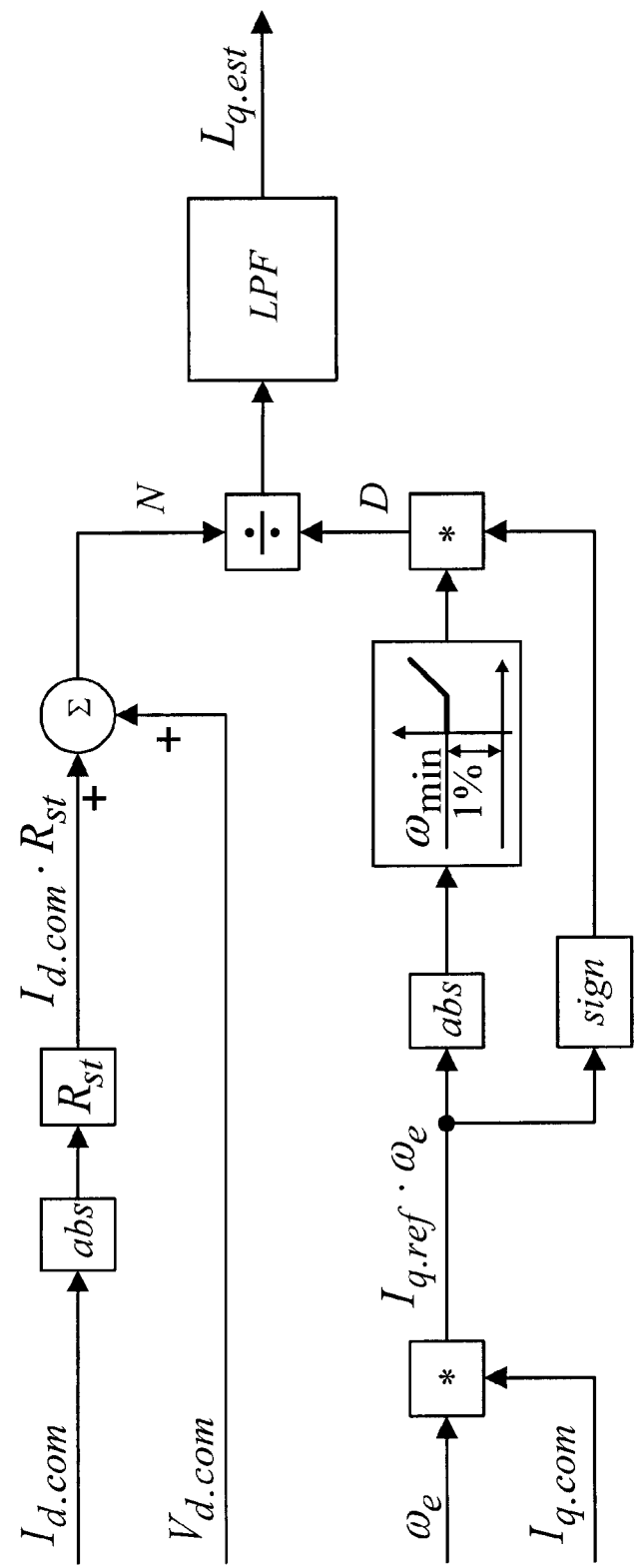
FIG. 11 is a detailed block diagram of the quadrature inductance $L_q$ estimator included in FIG. 7, FIG. 8 and FIG. 9.

However, since the quadrature inductance $L_q$ varies during operation as a function of saturation and the magnetic flux $\Psi_{m0}$ varies during operation as a function of temperature, the block diagram illustrated in FIG. 4 and in FIG. 5 can further augmented to take these variations into account. As illustrated in FIG. 6 and in FIG. 7, an adaptive control block diagrams can be developed (based on two or three tables approach) that is designed to compensate for quadrature inductance $L_q$ and magnetic flux $\Psi_{m0}$ variations with saturation and temperature, respectively. Additionally, a detailed block diagram of the flux estimator $\Psi_m$ included in FIG. 6 and in FIG. 7 is shown in FIG. 10 and a detailed block diagram of the quadrature inductance $L_q$ estimator of FIG. 6 and in FIG. 7 is shown in FIG. 11. Both of those estimators are based on Equations 4 and 5.

Therefore, a system and method is provided for controlling any of a variety of motors using a single motor control unit having stored therein a torque-current relationship at approximately maximum torque-per-amp derived based on motor parameters normalized with respect to demagnetization current of a motor. That is, the present invention facilitates improved control of both internal and surface PM motors by normalizing motor parameters with respect to the current required to demagnetize the motor magnet to derive a maximum torque-current relationship. Using the torque-current relationship, the motor control unit can control any of a variety of motors. While some other solutions provide some of the functionality of the above-described systems and methods, such as systems that support PM motors up to base speed, are not capable of controlling any of a variety of motors with such minimal configuration or initialization.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A motor control system comprising:
a motor drive unit coupled to a motor;
at least one controller configured to control the motor drive unit to drive the motor;
at least one memory unit accessible by the at least one controller and having stored therein at least one table relating motor torque and motor current at approximately maximum torque using motor parameters normalized with respect to demagnetization current of a motor; and
wherein the at least one controller is configured to access the at least one memory unit and control the motor drive unit to drive the motor based on the at least one table.

2. The motor control system of claim 1 wherein the controller is configured to control the motor drive unit to control any of a variety of permanent magnet motors coupled therewith based on the at least one table.

3. The motor control system of claim 2 wherein the variety of permanent magnet motors includes surface permanent magnet synchronous motors and interior permanent magnet synchronous motors.

4. The motor control system of claim 1 wherein the controller is configured to use a torque reference value as a first input to a first of the at least one table and a ratio of quadrature and direct inductance of the motor less a predetermined value as a second input to the first table to derive a substantially optimum per-unit stator current using the table.

5. The motor control system of claim 4 wherein the controller is further configured to use the substantially optimum per-unit stator current as a first input for a second of the at least one table and the ratio of quadrature and direct inductance of the motor less the predetermined value as a second input to the second table to derive at least one of a substantially optimum per-unit direct current and a substantially optimum per-unit quadrature current.

6. The motor control system of claim 5 wherein the controller is further configured to derive command direct current values and command quadrature current values using at least the first and second tables and control the motor using conventional current loops by using the command direct current values and command quadrature current values as reference values.

7. The motor control system of claim 5 wherein the controller is further configured to derive only a first of the substantially optimum per-unit direct current and the substantially optimum per-unit quadrature current from the first table and the second table and derive a second of the substantially optimum per-unit direct current and the substantially optimum per-unit quadrature current using a relationship between the first of the substantially optimum per-unit direct current and a substantially optimum per-unit quadrature current to the torque reference value and the ratio of quadrature and direct inductance less the predetermined value.

8. The motor control system of claim 1 wherein the at least one controller is configured to operate according to an adaptive control algorithm to compensate for variations in quadrature inductance due to saturation and variations in magnetic flux due to temperature variations.

9. The motor control system of claim 8 wherein the adaptive control algorithm includes a flux estimation algorithm and a quadrature inductance estimation algorithm.

10. A motor control system configured to control a variety of permanent magnet motors, the motor control system comprising:
a memory unit having stored therein a torque-current relationship at approximately maximum torque per amp derived based on motor parameters normalized with respect to demagnetization current of a motor; and
a processor configured to access the memory unit and control any of a variety of permanent magnet motors using the torque-current relationship stored therein.

11. The motor control system of claim 10 wherein the variety of permanent magnet motors includes surface permanent magnet synchronous motors and interior permanent magnet synchronous motors.

12. The motor control system 11 further comprising at least one table stored in the memory unit and based on the torque-current relationship at approximately maximum torque per amperage derived based on motor parameters normalized with respect to demagnetization current of the motor.

13. The motor control system 12 wherein the processor is further configured to use a torque reference value as a first input to a first of the at least one table and a ratio of quadrature and direct inductance of the motor less a predetermined value as a second input to the first table to derive a substantially optimum per-unit stator current using the table.

14. The motor control system 13 wherein the processor is further configured to use the substantially optimum per-unit stator current as a first input for a second of the at least one table and a ratio of quadrature and direct inductance of the motor less the predetermined value as a second input to the second table to derive at least one of a substantially optimum per-unit direct current and a substantially optimum per-unit quadrature current and derive command direct current values and command quadrature current values using at least the first and second tables to thereby control the motor using conventional current loops by using the command direct current values and command quadrature current values as reference values.

15. The motor control system of claim 14 wherein the processor is further configured to derive only a first of the substantially optimum per-unit direct current and the substantially optimum per-unit quadrature current from the first table and the second table and derive a second of the substantially optimum per-unit direct current and the substantially optimum per-unit quadrature current using a relationship between the first of the substantially optimum per-unit direct current and the substantially optimum per-unit quadrature current to the torque reference value and the ratio of quadrature and direct inductance less the predetermined value.

16. The motor control system of claim 10 further comprising an adaptive control system configured to compensate for variations in quadrature inductance due to saturation and variations in magnetic flux due to temperature variations.

17. A method for controlling a permanent magnet motor system, the method comprising:
   normalizing motor parameters with respect to demagnetization current of a motor;
   developing a torque-current relationship using the normalized motor parameters at approximately maximum torque per amperage; and
   controlling any of a variety of permanent magnet motors using the developed torque-current relationship to reduce operational losses.

18. The method of claim 17 further comprising developing a plurality of tables from the torque-current relationship and accessing the tables to control a particular motor of the variety of permanent magnet motors including surface permanent magnet synchronous motors and interior permanent magnet synchronous motors.

* * * * *

UNITED STATES PATENT AND TRADEMARK OFFICE
CERTIFICATE OF CORRECTION

PATENT NO. : 7,609,014 B2
APPLICATION NO. : 11/550944
DATED : October 27, 2009
INVENTOR(S) : Royak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this

Twelfth Day of October, 2010

David J. Kappos
*Director of the United States Patent and Trademark Office*